United States Patent

Rusch

[15] 3,659,284

[45] Apr. 25, 1972

[54] TELEVISION GAMING APPARATUS

[72] Inventor: William T. Rusch, Hollis, N.H.

[73] Assignee: Sanders Associates, Inc., Nashua, N.H.

[22] Filed: May 27, 1969

[21] Appl. No.: 828,154

[52] U.S. Cl. ..............................340/324 A, 178/6.8, 273/85, 315/22, 315/30

[51] Int. Cl. ..............................G08b 5/22

[58] Field of Search ..............................340/324 A; 315/22; 178/6.8

[56] References Cited

UNITED STATES PATENTS

| | | | |
|---|---|---|---|
| 2,455,992 | 12/1948 | Goldsmith et al. | 315/22 |
| 2,847,661 | 8/1958 | Althouse | 315/22 X |
| 3,017,625 | 1/1962 | Evans et al. | 340/324 A |
| 3,158,858 | 11/1964 | Ragen et al. | 340/324 A X |
| 3,249,796 | 5/1966 | Moffitt | 315/22 |
| 3,497,760 | 2/1970 | Kiesling | 178/6.8 X |

*Primary Examiner*—David L. Trafton
*Attorney*—Louis Etlinger

[57] ABSTRACT

Apparatus and methods are herein disclosed for use in conjunction with standard monochrome and color television receivers, for the generation, display and manipulation of symbols or geometric figures upon the screen of the television receivers for the purpose of playing games. The invention comprises in one embodiment a control unit, connecting means and in some applications a television screen overlay mask utilized in conjunction with a standard television receiver. The control unit includes the control means, switches and electronic circuitry for the generation, manipulation and control of video signals which are to be displayed on the television screen. The symbols are generated by developing current pulses proportional to predetermined portions (slices) of horizontal and vertical sawtooth waves. The connecting means couples the video signals to the receiver antenna terminals thereby using existing electronic circuits within the receiver to process and display the signals. An overlay mask which may be removably attached to the television screen may determine the nature of the game to be played. Control units may be provided for each of the participants. Alternatively, games may be carried out in conjunction with background and other pictorial information originated in the television receiver by commercial TV, closed-circuit TV or a CATV station.

59 Claims, 35 Drawing Figures

INVENTOR.
WILLIAM T. RUSCH
BY Richard I. Seligman
ATTORNEY

*INVENTOR.*
WILLIAM T. RUSCH
BY
Richard S. Seligman
*ATTORNEY*

INVENTOR.
WILLIAM T. RUSCH
BY Richard J. Seligman
ATTORNEY

INVENTOR.
WILLIAM T. RUSCH
BY Richard J. Seligman
ATTORNEY

INVENTOR.
WILLIAM T. RUSCH
BY Richard I. Seligman
ATTORNEY

INVENTOR.
WILLIAM T. RUSCH
BY Richard I. Seligman
ATTORNEY

INVENTOR.
WILLIAM T. RUSCH
BY Richard S. Seligman
ATTORNEY

INVENTOR.
WILLIAM T. RUSCH
BY Richard A. Seligman
ATTORNEY

INVENTOR.
WILLIAM T. RUSCH
BY Richard S. Seligman
ATTORNEY

INVENTOR.
WILLIAM T. RUSCH
BY Richard J. Seligman
ATTORNEY

INVENTOR.
WILLIAM T. RUSCH
BY Richard J. Seligman
ATTORNEY

INVENTOR.
WILLIAM T. RUSCH
BY Richard A. Seligman
ATTORNEY

INVENTOR.
WILLIAM T. RUSCH
BY Richard J. Seligman
ATTORNEY

INVENTOR.
WILLIAM T. RUSCH
BY Richard J. Seligman
ATTORNEY

INVENTOR.
WILLIAM T. RUSCH
BY Richard I. Seligman
ATTORNEY

INVENTOR.
WILLIAM T. RUSCH
BY Richard S. Seligman
ATTORNEY

TELEVISION GAMING APPARATUS

This invention relates to the subject matter disclosed in application Ser. No. 126,966 filed Mar. 22, 1971, a continuation of application Ser. No. 697,798 filed Jan. 15, 1968, now abandoned; and application Ser. No. 713,862, filed Mar. 18, 1968, now U.S. Pat. No. 3,497,829.

BACKGROUND OF THE INVENTION

This invention relates to an apparatus and method by means of which standard television receivers can be utilized as active rather than passive instruments. This is accomplished in certain embodiments by having participants manipulate controls of a control unit connected to the television receiver to cause a symbol, such as a rectangle, circle, ring, star, cross, spot or a plurality of spots, to be displayed upon the television screen by means of which the participants can play a variety of games, participate in simulated training programs, as well as carry out other activities. By way of example, modified versions of the well-known game of ping-pong may be played by two participants by physically or electronically placing an appropriate mask representing the net upon the screen of the television receiver. Three displayed spots represent two paddles and a ball wherein the ball is moved in a particular direction when "-hit" by a paddle.

Heretofore, color and monochrome television receivers have been used generally by the home and other viewers as passive devices; i.e., the television receiver is used only as a display means for programming originating at a studio. The viewer is limited to selecting the presentations available for viewing and is not a participant to the extent that he can control or influence the nature of, or add to the presentation displayed on the receiver screen.

A standard receiver employed with auxiliary equipment to provide an active form of home entertainment is described in a patent application for "Television Gaming and Training Apparatus," Ser. No. 126,966 filed Mar. 22, 1971 a continuation of Ser. No. 697,798, filed Jan. 15, 1968, and assigned to the assignee of this application. Since most homes are equipped with television receivers, the only expense required to provide added family enjoyment is the expense of a control unit of one type or another.

SUMMARY OF THE INVENTION

Accordingly, it is an object of the present invention to provide apparatus and methods for displaying video signals on the screen of a television receiver, where some or all of the video signals are both generated and controlled by apparatus external to the television receiver.

It is another object of the present invention to provide an apparatus and method wherein a standard color or monochrome television receiver is utilized as an active instrument for playing various types of games involving one or more participants.

It is a further object of the present invention to provide a device whereby an individual may pit his alertness, skill, manual dexterity and visual acuity against automatically controlled video displays.

It is yet a further object of the present invention to provide an apparatus which will generate spots such as squares, rectangles, circles, rings, stars, etc. which may be controlled by one or more participants for playing various types of games.

It is another object of the present invention to provide a cathode ray tube apparatus for displaying symbols to be manipulated by participants.

It is yet another object of the present invention to provide an apparatus which will allow one or more participants to actively use a standard television set while receiving background and other pertinent pictorial information from a cooperative commercial TV, closed-circuit TV, or CATV station, thus combining or alternating studio and home-generated information on the TV screen.

It is still another object of the present invention to allow the use of a standard TV set for gaming or other activities without the need for any kind of internal electrical connection to the TV set for the introduction of video and/or chroma signals, connections being required to be made only to the externally-accessible antenna terminals.

In accordance with one embodiment of the present invention, a television gaming apparatus is provided for generating video signals in accordance with the standardized television format, which signals may be controlled by an individual operator by means of a joystick or other manually operative means. The television gaming apparatus comprises control apparatus having included therein the necessary electronic circuits to produce video signals which are compatible with standard television receivers.

The control apparatus has video signal control means mounted thereon for each access and connecting means are provided for coupling the video signals generated within the control box to the television receiver.

By way of illustration, the television gaming apparatus can be used for playing a game of ping-pong by providing on a TV screen two spots which represent paddles. Means are provided for enabling the players to control the vertical movement of the spots. Means are also provided for generating on the screen of the television receiver a third spot which represents the ping-pong ball, which spot automatically moves from an off-screen left position to an off-screen right position and vice versa unless "hit" by a paddle spot whereupon the ball spot will change direction. The players have further controls for changing the vertical position of the ball spot.

Suitable overlays or presentations from a cooperative TV station may be used in conjunction with said games to enhance the asthetic appeal thereof.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
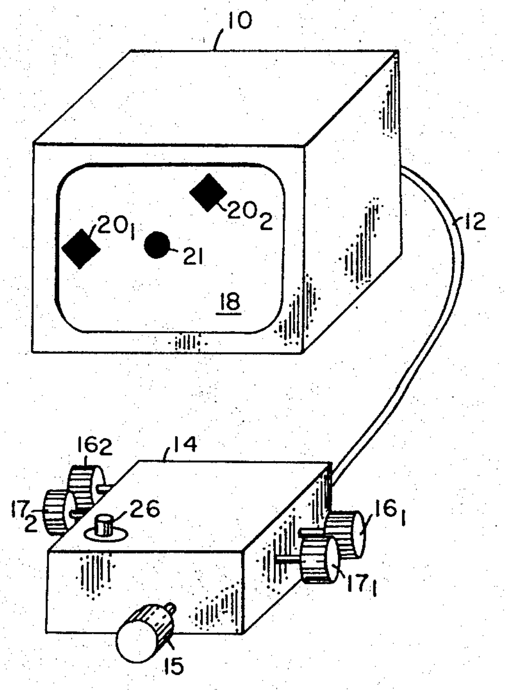
FIG. 1 is a pictorial view illustrating the principle components of an embodiment of the invention.

The principal components of one embodiment of a television gaming system configured according to the invention are illustrated in FIG. 1 which is a pictorial view showing a television receiver 10, a control unit 14 and means 12 for connecting control unit 14 to receiver 10. The television receiver 10 employed can be any of the standard commercially available models that are generally used for home entertainment. Either a monochrome or color television set may be used with the present invention since the basic principles of the invention apply to both types. The connection means 12 is in this embodiment a shielded cable, for example, shielded twin lead, and is attached to the antenna terminals of receiver 10 in conventional fashion.

Control unit 14 generates video signals shown as spots $20_1$, $20_2$ and 21. The spots $20_1$ and $20_2$ are positioned on the receiver screen 18 by knobs $16_1$, $17_1$, and $16_2$, $17_2$, respectively. For clarity, the spot 21 is illustrated as a circle and the spots 20 are illustrated as diamonds, however, many shapes can be generated. In the devices to be described hereinafter, circles are generally employed.

Knob 16 controls the vertical position of spot $20_1$ while knob 17 controls the horizontal position thereof. Thus, it can be seen that the spot $20_1$ may be positioned at any point on the screen by the proper manipulation of knobs 16 and 17. Spot $20_2$ is positioned in like manner by knob $16_1$, $17_1$. In this embodiment spot 21 is automatically positioned on screen 18 without manual control. This will be described more fully hereinafter. A reset switch 26 is shown on the control unit 14 and is used to reset the picture on the television screen. For example, a game may be played in which one spot is to be positioned over the other and when this is accomplished one spot will disappear and the background will change color. When games of this nature are played, a reset means is required before play can be resumed. Reset switch 26 performs this function.

Figure 1A:
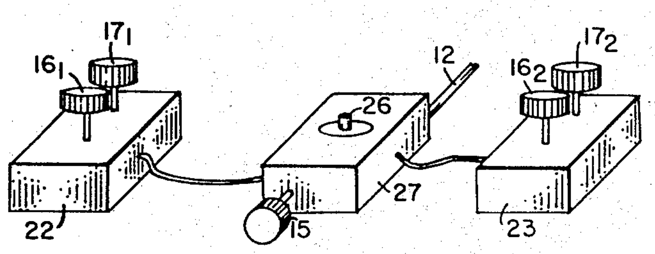
FIG. 1A is a pictorial view illustrating an alternate embodiment for the control unit of FIG. 1.

A knob 15 controls background color for color TV receiver applications wherein a chroma generator is employed in the manner set forth in said application Ser. No. 126,966. Alternatively, control unit 14 may be broken up into a master control unit containing the electronic circuits and individual control units containing control knobs $16_1$, $17_1$, and $16_2$, $17_2$, whereby each participant may operate from a position away from the other and so not to interfere with other players. This is illustrated in FIG. 1A wherein control unit 14 is broken up into a master control unit 27 and individual control units 22 and 23. The master control unit 27 contains the electronic circuitry found in control unit 14 and controls 26 and 15. Knobs 16, 17 and $16_1$, $17_1$ which position the spots $20_1$ and $20_2$ are situated on individual control units 22 and 23 respectively.

The knobs 16, 17 may be combined into a single joystick permitting control of the horizontal and vertical spot positioning by a single control means.

Other spot position control means (not shown) can be incorporated into the control unit(s) and these will be described hereinafter.

Rather than provide a separate control unit, the electronic circuitry of the control unit could be built into the television receiver as a constituent part thereof and the receiver sold as both an active and passive home entertainment system. Control units containing the actual manipulating controls can be provided as above.

A typical sequence of steps to play a game using the present invention would be as follows: 1. Attach connection means 12 to TV set 10 at the antenna terminals thereof, if not already attached; 2. turn the TV set on: 3. select the proper channel on the set for the control unit being used; 4. apply power to the control unit; 5. attach a mask on the face of the TV screen; if required for the game to be played; 6. begin the game.

Figure 2:
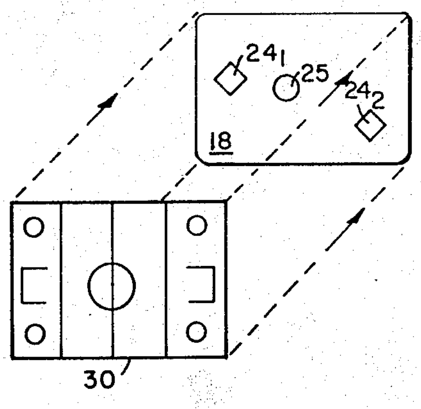
FIG. 2 is a sketch illustrating a typical TV screen and overlay mask as employed in an embodiment of this invention.

Referring now to FIG. 2, a television screen 18 is illustrated having three spots $24_1$, $24_2$, and 25 displayed thereon. Spots 24 are "hitting" spots and spot 25 is a "hit" spot. Spots $24_1$ and $24_2$ represent, for example, hockey players while spot 25 represents a hockey puck. An overlay mask 30 of some type of transparent material such as plastic or the like, having some type of pattern, picture or other illustration pertaining to the particular game to be played is shown in a lifted position. Prior to engaging in a game, the overlay mask 30 is temporarily attached to television screen 18 and in such close proximity to it as not to create any distortion when viewed with reference to spots 24 and 25. One type of overlay mask represents a hockey field to be used for playing a modified game of hockey. Still another pattern could represent a ping-pong table, baseball diamond, etc. These are but a few of the many type games that can be adapted for use with the present invention.

Alternatively, rather than employ overlay mask 30, the pattern to be provided could be displayed directly on the screen 18. The pattern could be broadcast by TV stations or alternatively could be sent to a non-used channel over closed-circuit or CATV lines. It could also be generated electronically in the video control system.

The basic theory of TV gaming devices as described herein is now set forth.

Figure 3:
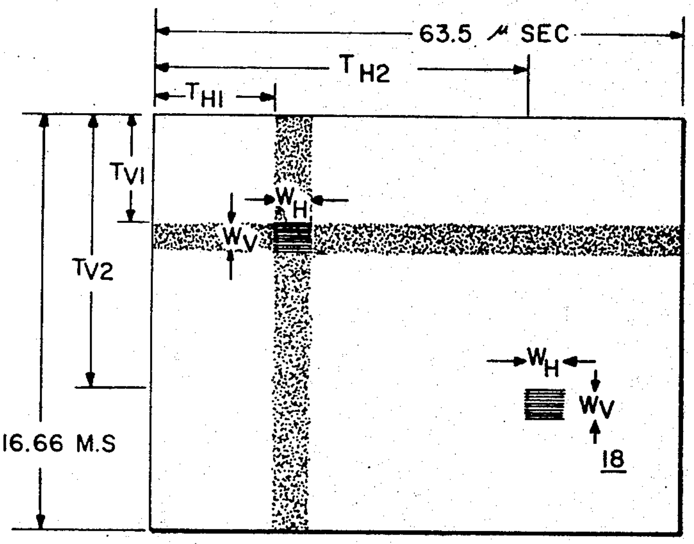
FIG. 3 is a sketch illustrating the manner in which spots are formed on a TV screen.

Referring to FIG. 3, at time zero the TV electron beam is at the upper left of screen 18. It starts moving quickly to the right and slowly downwards. Sixty-three and one-half (63.5) microseconds later a 5 microsecond horizontal sync pulse is fed into the TV set, causing the beam to fly back rapidly to the left of the screen. The beam then moves to the right for 63.5 microseconds until the next horizontal sync pulse causes the next flyback to the left. After about 250 such horizontal scans (lines) the beam has progressed to the bottom of the screen. A vertical sync pulse fed into the TV set causes rapid (1 millisecond) vertical flyback to the top of the screen and another cycle begins.

Now, still referring to FIG. 3, assume that the major portion of the screen is dark (beam blanked) except for the areas shown as SPOT 1 and SPOT 2. The spots are made by passing a (positive) unblanking video signal to the TV set when, and only when, the "beam" is passing over the areas of the spots. (Quotes are used around beam because although there is no real beam when blanking is in effect, the scanning signals occur and can be thought of as still moving the "non-existent beam" in the scanning pattern).

The video (unblanking) signals required for spot generation are described with the aid of FIG. 3. To derive SPOT 1, assume that a pulse of width $W_H$ is generated $T_{H1}$ microseconds after the occurrence of each horizontal sync pulse. Define these new pulses as $P_{H1}$ — horizontal video pulse for SPOT 1. If these $P_{H1}$ pulses were used as unblanking (video) in the TV set, the beam would brighten whenever it had moved a distance equivalent to $T_{H1}$ from the left side of the screen. If would stay bright for a length equivalent to $W_H$ and then darken. This would happen all during the vertical scan and 250 bright little line segments of width $W_H$ would appear to the eye as a vertical column (shown shaded in FIG. 3).

Now, SPOT 1 vertical video pulses $P_{V1}$ are made to be of width $W_V$ and to occur $T_{V1}$ milliseconds after the start of the vertical sweep. $W_V$ is on the order of 63.5 microseconds, permitting some 10 horizontal scans to take place while $P_{V1}$ is on. If $P_{V1}$ were used alone as the unblanking (video) signal to the TV set, ten lines the width of the set would be brightened while $P_{V1}$ was on and a bright horizontal bar of width $W_V$ (shown shaded in FIG. 3) would be viewed.

As the last step in spot generation, SPOT 1 horizontal video pulses ($P_{H1}$) and vertical video pulses ($P_{V1}$) are passed through a coincidence gate. The gate has an output only when both $P_{H1}$ and $P_{V1}$ are on. The gate output becomes SPOT 1 video (unblank) signal. From FIG. 3 it is obvious that the beam is now unblanked only where the $P_{H1}$ vertical shaded column and the $P_{V1}$ horizontal shaded bar overlap. Thus, a bright spot SPOT 1, comprised of about 10 small line segments, each $W_H$ wide, is developed. SPOT 2 is developed in the like manner.

Figure 4:
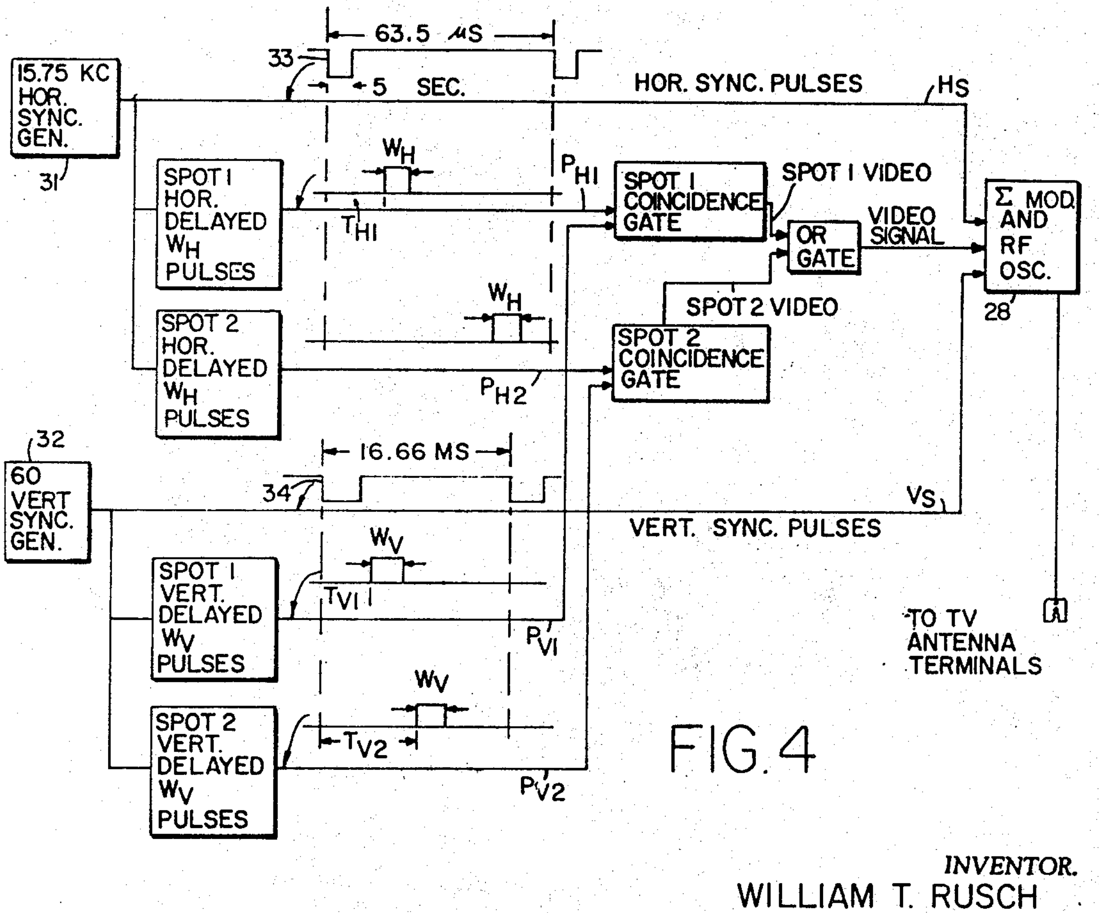
FIG. 4 is a block diagram illustrating the spot generation.
Figure 5:
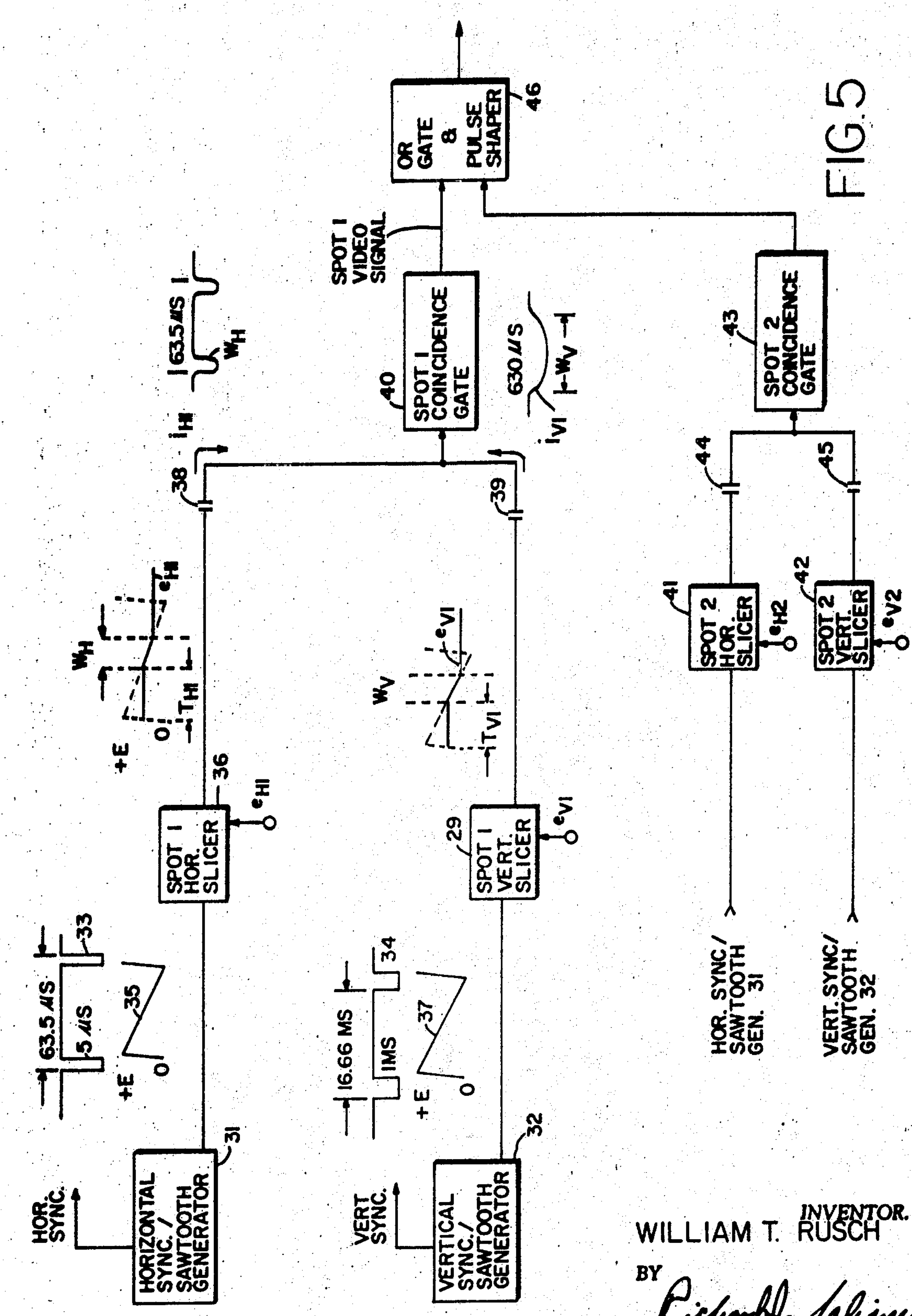
FIG. 5 is a block diagram of the preferred mode of generating spots on a TV screen.

FIGS. 4 and 5 are block diagrams illustrating the manner in which the signals discussed with respect to FIG. 3 are generated.

The timing for the television gaming system is established by a horizontal sync/sawtooth generator 31 and a vertical sync/sawtooth generator 32. The horizontal sync/sawtooth generator 31 generates a series of negative horizontal sync pulses 33 having a repetition rate equivalent to the standard horizontal scanning frequency used in United States commercial television receivers and the vertical sync/sawtooth generator generates a series of negative vertical sync pulses 34.

The vertical sync/sawtooth generator 31 also generates a 15.75 KHz sawtooth wave 35 (refer now to FIG. 5). Sawtooth wave 35 has end limits of +E and O. It is directly coupled to a SPOT 1 horizontal slicer 36. A "slice" of the sawtooth ramp of length $W_H$ is passed through the slicer. By varying voltage $e_{H1}$, delay $T_{H1}$ can be varied for spot positioning from left to right of the TV screen.

A 60Hz sawtooth 37 is generated by vertical sync/sawtooth generator 32 and is similarly sliced in a SPOT 1 vertical slicer 29, to give ramp width $W_V$ and voltage controlled delay $T_{V1}$. The two sliced waves are differentiated by capacitors 38 and 39 which connect to the low input impedance of a SPOT 1 coincidence gate 40. Since the current through a capacitor is C de/dt, current pulses appear only during the ramp portions of the sliced waveforms. Although the slope of the vertical ramp is only about one two hundred and sixtieth times that of the horizontal ramp (60 Hz/15,750 Hz), by making capacitor 39 approximately 260 times the value of capacitor 38, current pulses $i_{H1}$ and $i_{V1}$ are made equal in magnitude. Both $i_{H1}$ and $i_{V1}$ must be present to exceed in magnitude the (negative) threshold of the gate thus producing the SPOT 1 video signal.

If the invention is to be employed in conjunction with TV systems having different frequencies (number of horizontal lines and vertical flyback) then the vertical and horizontal sync/sawtooth generators would be constructed at the different frequencies. This would be particularly applicable in conjunction with foreign (other than U.S.) TV systems.

Other spots are generated in similar fashion. For example, SPOT 2 horizontal slicer 41 is also coupled to the horizontal sync/sawtooth generator 31 and SPOT 2 vertical slicer 42 is also coupled to vertical sync/sawtooth generator 32. The horizontal and vertical slicers 41 and 42 are coupled to a SPOT 2 coincidence gate 43 by capacitors 44 and 45, respectively. All video spot signals are fed to an OR gate and pulse shaper 46. The OR gate prevents excessive brightening when spots are positioned on top of one another. The pulse shaper is required because in the present embodiment 6 volt sawtooth waveforms are used. With such low voltage the slicing action is soft (rounding at beginning and end of ramp slice). Consequently, the current pulses produced by differentiation of the ramp slicers are rounded pulses. Without shaping they produce a spot without sharply defined edges . . . the edges just "fade out" gradually into the dark background. The summer modulater and RF oscillator 28 are set forth in said patent application Ser. No. 126,966. The RF signal presented to the antenna terminals is detected and processed by the TV receiver in the standard manner and displayed on the screen thereof. The output from OR gate and pulse shaper 46 is applied to a summer which sums all the signals presented thereto (including sync pulses from the horizontal and vertical sync/sawtooth generators, outputs from chroma generator, if used, etc.). This forms the composite video signal. This signal is applied to a modulator and RF oscillator for modulating the video information with the RF oscillator carrier to generate the requisite modulated RF signal which is coupled to the TV antenna terminals.

One of the objects of the present invention is a system to produce a round spot which in some instances is more pleasant and interesting than a square or rectangular spot, (especially for "ball" games like ping-pong, baseball, etc.). This is achieved (even with the pulse shaper which just gives the round spot sharply defined edges) by the "rounded edges" of the current pulses going into the coincidence gate. For example, the leading and trailing edges of current pulse $i_{V1}$ are rounded. Thus any $i_{H1}$ pulses which are added to $i_{V1}$ at this time will have thinner portions protruding below the gate threshold level than those appearing during the full amplitude middle of $i_{V1}$. Subsequent pulse shaping of the pulses which "get past" the gate threshold steepens their sides (for sharp spot edges) but doesn't change their width. Thus the spot is narrower at top and bottom than it is in the middle.

Figure 6:
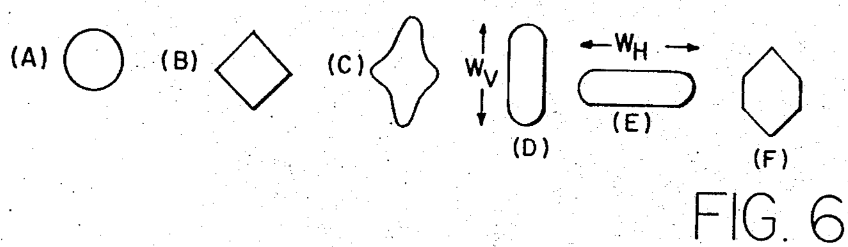
FIG. 6 is a plurality of sketches illustrating shapes of representative spots.

Some of the various spot shapes which can be generated are shown in FIG. 6. Spots a, b and c are generated simply by varying the coincidence gate threshold 53. (For an individual spot. Or, all spots can be made to change shape together by changing the amplitude and slope of the common sawtooth generators.)

Spots d and e are made either by changing sawtooth slope (thus changing $W_H$ and $W_V$), or by changing the slice amplitude (again changing $W_H$ and $W_V$).

Various other shapes (four pointed star, cross, etc.) can be generated by simple adjustments of various component values or voltages and by switching. All spots can be made hollow as described hereinafter.

Figure 7:
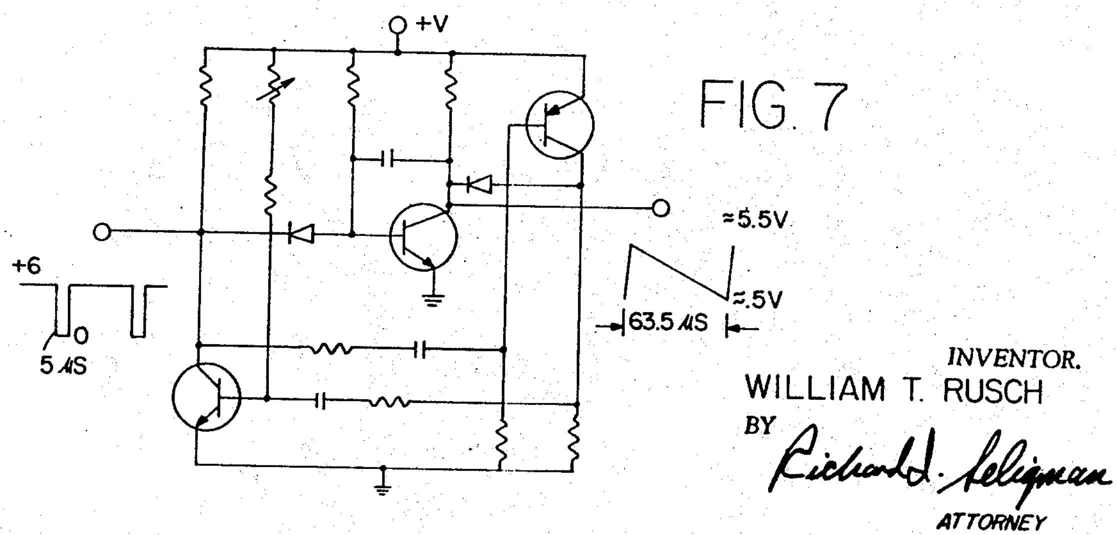
FIG. 7 is a schematic of a sync/sawtooth generator employed in the embodiment of FIG. 5.

Referring now to FIG. 7, there is illustrated thereby schematically one embodiment of the sync/sawtooth generators. A generator of this type is described in detail in my co-pending patent application for "Linear Sawtooth Generator" Ser. No. 713,862, filed Mar. 18, 1968, now U.S. Pat. No. 3,497,829.

Figure 8:
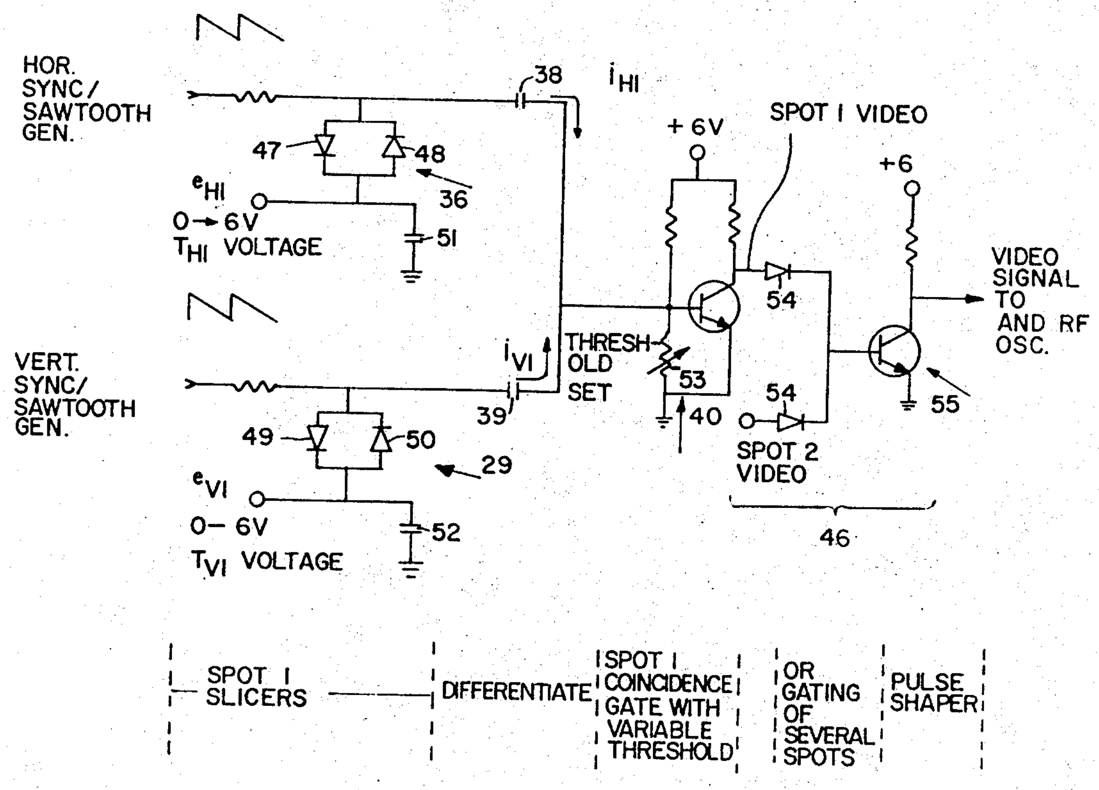
FIG. 8 are schematics of circuits employed in the embodiment of FIG. 5.

The SPOT 1 slicers 36, 29, the SPOT 1 coincidence gate 40 and the OR gate and pulse shaper 46 are illustrated schematically in FIG. 8. The horizontal 15.75 Hz sawtooth waveform 35 and the vertical 60 Hz sawtooth wave 37 waveform are sliced in the slicers 36 and 29, respectively. The slicers comprise means for generating a predetermined slice of the sawtooth waveforms and in the present embodiment include back-to-back diodes 47, 48, and 49, 50, respectively. The input sawtooth waveforms are applied to one side of the diode pair, with the other side being capacitively coupled via capacitors 51, 52, respectively to ground and being supplied voltages $e_{H1}$ and $e_{V1}$, respectively. Diodes 47 – 50 are preferably germanium diodes because their low conduction voltage drops permit the achievement of reasonably small spot size (determined by sliced ramp duration) with a 6 volt sawtooth. The capacitors 51, 52 serve to make delay control voltages $e_{H1}$ and $e_{V1}$ appear as true voltage sources in cases where they come from the sliders of relatively high impedance potentiometers. The differentiating capacitors 38, 39 producing $i_{H1}$ and $i_{V1}$ are followed by the coincidence gate 40. Variable threshold level is provided by a potentiometer 53 to produce desired spot size and shape as mentioned hereinbefore.

Spot video signals are passed through a diode OR gate 54 of the OR gate and pulse shaper 46. The "multi spot" OR'd video signal then passes through a pulse shaper 55 which steepens the sides and squares off the tops of the pulses, giving sharply defined spot edges and uniform brightness over the area of the spot.

The pulse shaped video signal is then fed, along with the negative horizontal and vertical sync signals (and chroma generator output, if applicable) to the summer and RF oscillator as indicated in FIG. 4.

If desirable, the 60 Hz sync can be extracted from a photosensor directed toward the front of the TV screen and horizontal sync can be obtained from a pickup coil as described in said patent application. Spots can be generated by using the video signal described above to short circuit or "-crowbar" the antenna terminals; the RF oscillator not being used. These features are compatible with a cooperating TV or CATV station as described in said patent application Ser. No. 126,966.

Figure 20:
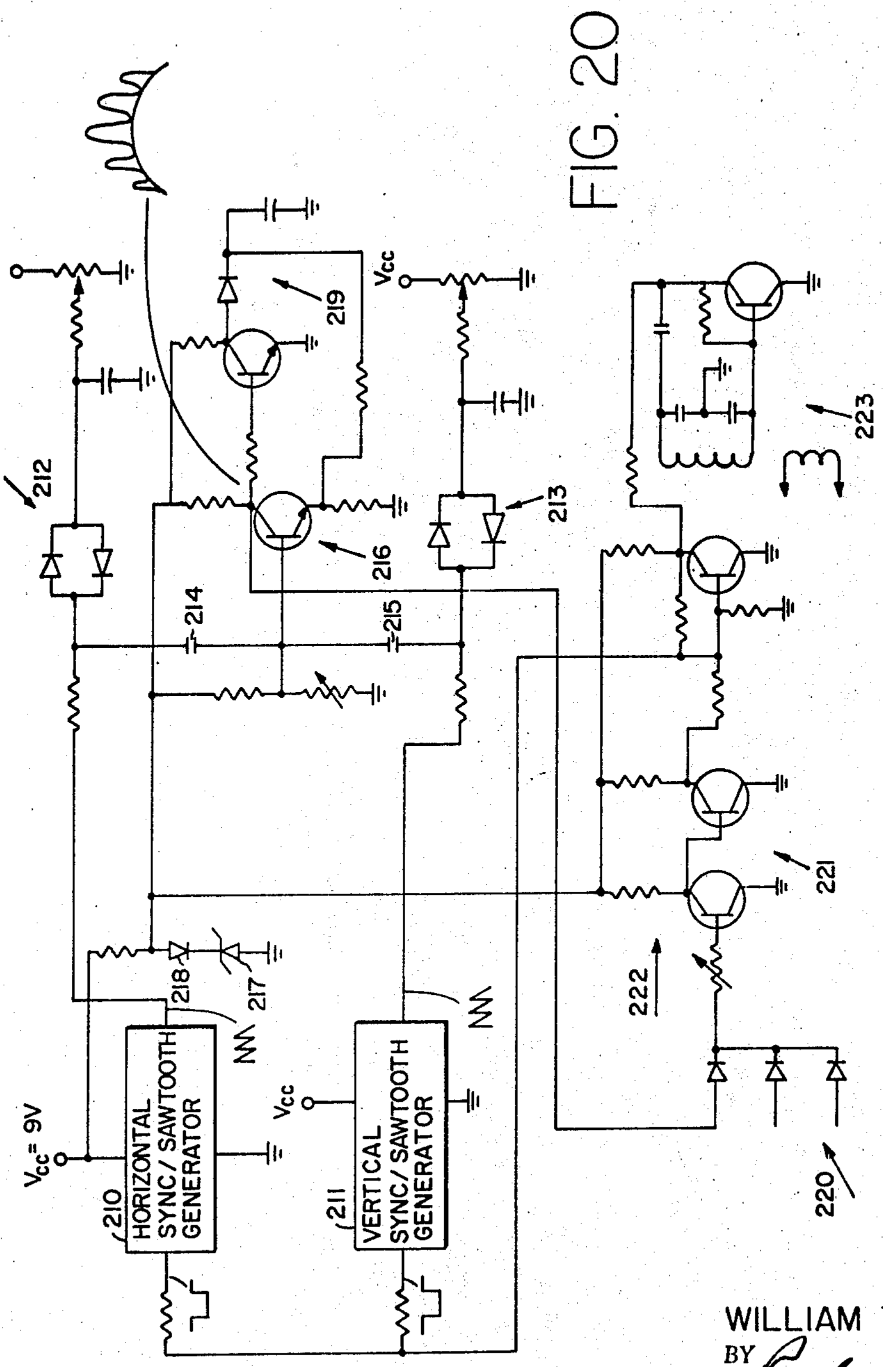
FIG. 20 is an alternate embodiment of circuits employed in the embodiment of FIG. 5.

Referring now to FIG. 20, there is illustrated thereby another embodiment of spot generation for TV gaming. This embodiment is very much like the embodiment of FIG. 8, however, changes have been made thereto for providing improved temperature and voltage stability such that the spots generated will maintain their size to a greater degree over wider temperature and voltage excursions.

The timing for the system is established by a horizontal sync/sawtooth generator 210 and a vertical sync/sawtooth generator 211. These generators are like the generators 31, 32 illustrated in FIG. 7, however, they use a higher Vcc voltage, in the instant example, 9 volts.

The sawtooth outputs of the generators 210, 211 are applied to a horizontal slicer 212 and vertical slicer 213, respectively. The slicers 212, 213 are like the slicers 36, 29 of FIG. 8 with the exception that silicon diodes are used in place of germanium diodes for temperature stability. However, silicon diodes have a much greater voltage drop and, therefore, the 9 volt sawtooth is used in order to get a steeper sawtooth and thereby not increase spot size which would occur if the 6 volt sawtooth of FIG. 8 was used.

The two sliced waves are differentiated, as before, by capacitors 214 and 215 and applied to a spot coincidence gate 216. The DC voltage for the spot coincidence gate 216 is stabilized by a zener diode 217. A diode 218 is also used for temperature compensation. The principal change in spot coincidence gate 216 as contrasted to spot coincidence gate 40 of FIG. 8 is the addition of a peak detector 219 which detects the peak of the horizontal spot pulses which ride on the vertical spot pulses and feeds this signal back to appropriately bias the coincidence gate to maintain spot size.

The OR gate 220, pulse shaper 221, summer 222 and RF oscillation and modulator 223 serve the same functions as described with respect to FIG. 8.

Prior to describing various games that can be played using the present invention, several of the electronic functions which the system is capable of providing are described herein. Many of these depend strongly upon the voltage control positioning features of the system.

The voltages $e_{Hn}$, $e_{Vn}$ (illustrated in FIGS. 5 and 8) control a spot's horizontal and vertical position. Changing $e_{Hn}$ from 0 volts to, for example, +6 volts moves a spot across the screen from off-screen right to off-screen left. A similar change in $e_{Vn}$ moves a spot from off-screen bottom to off-screen top.

Figure 9A:
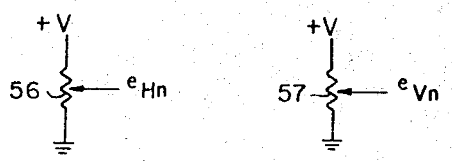
FIG. 9A is a schematic of potentiometer controls used to generate slicer control voltages.

In one embodiment, the $e_H$ and $e_V$ voltages are derived from the slides of the potentiometer 56 and 57 which are connected between ground, and, for example, +6 volts (see FIGS. 9A). Knobs 16, 17 and 16, 17 of FIGS. 1 and 1A are attached to the potentiometers controlling the positions of SPOT 1 and SPOT 2. If more than two positioned spots are required, additional potentiometers and knobs $16_n$, $17_n$ would be required in addition to spot horizontal and vertical slicers and spot coincidence gates. Alternatively, two potentiometers (one vertical, one horizontal) may be connected to a single joystick 58 in order to provide the user single handed control of position (see FIG. 9B).

If the control potentiometers 57, 58 are followed by integrators 59, 60, respectively, (see FIG. 9C) with $e_{Hn}$ and $e_{Vn}$ obtained from the outputs of the integrators, a different type of spot positioning is obtained. For example, with the two potentiometers mechanically connected to a single joystick 58, the spot will move as long as joystick 58 is away from its center position. The speed of spot movement is proportional to the distance the joystick is offset from its center position and the direction of spot motion is determined by the angular position of the joystick.

Figure 9B:
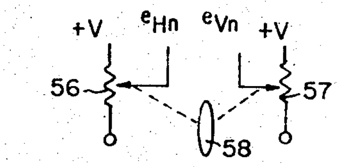
FIG. 9B is a schematic of joystick controlled potentiometers used to generate slicer control voltages.
Figure 9C:
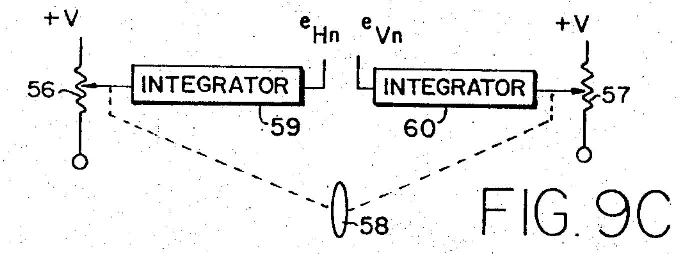
FIG. 9C is a schematic of joystick controlled potentiometer-integrator control used to generate slicer control voltages.

Whereas the simple H and V joystick of FIG. 9B gives direct control in which the spot returns to center screen when the joystick is returned to center, this "integrator joystick" of FIG. 9C merely stops the spot wherever it happens to be when the joystick is returned to center position.

The resulting "spongier" positioning action is much more interesting for certain types of games such as chase, hockey ("spongy" motion simulates gliding skaters very well) soccer, car racing, etc.

Figure 10A:
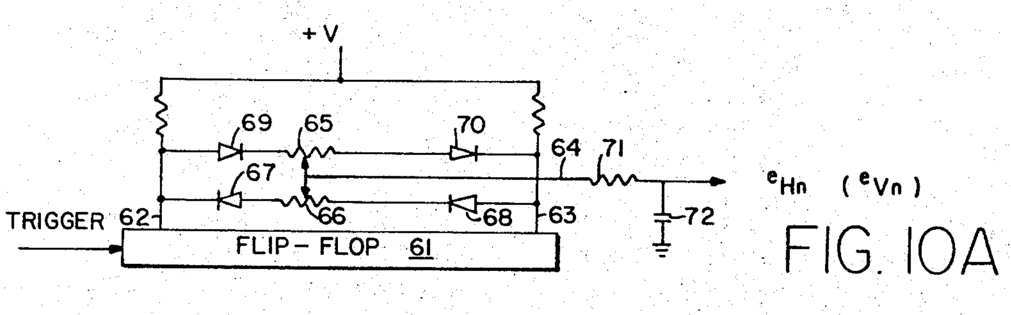
FIG. 10A is a schematic of a position flip-flop circuit used to control spots in certain applications of this invention.

Referring now to FIG. 10A there is illustrated thereby yet another arrangement for providing spot positioning voltages $e_{Hn}$ and $e_{Vn}$.

When the flip-flop 61 is set so that output 62 is high and output 63 is low, the voltage at point 64 can be varied from approximately 0 to + V volts (for example, 6 volts) by adjusting potentiometer 65 (Potentiometer 66 has no effect since it is disconnected from the circuit by a pair of back biased diodes 67, 68). With flip-flop 61 in its other stable state, potentiometer 66 controls the voltage at point 64 and potentiometer 65 is disconnected by a pair of diodes 69, 70.

If the delay control voltage lead for a spot (the $e_{Vn}$ or $e_{Hn}$ input) is connected to point 64 the spot can be made to move (rapidly) between two stable positions. The stable positions being controlled by potentiometers 65 and 66.

For certain applications, rapid motion is not desirable. In these cases an RC time constant provided by a resistor 71 and a capacitor 72 is added. The spot still moves between two stable positions but gives the effect of moving fast when "kicked" or "hit" and then gradually slowing down and finally stopping.

If the RC time constant is replaced by an integrator the spot will move at constant velocity. Naturally, if two flip-flops are used (one for horizontal and one for vertical) a spot can be made to move to any one of four pot-controllable stable positions.

Figure 10B:
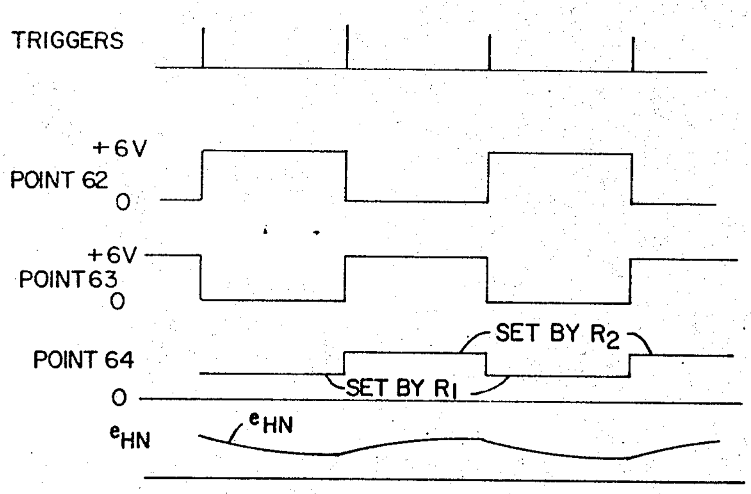
FIG. 10B are sketches of representative waveforms of the circuit of FIG. 10A.

Typical waveforms taken at points 62, 63, and 64 are illustrated in FIG. 10B. The trigger to flip-flop 61 can be the output from a coincidence circuit or a "serve" flip-flop as will be described hereinafter.

By changing the triggering sequence of two flip-flops different paths are obtained. A slow free-running flip-flop is useful to "serve" a ball which has gone off-screen when used in a ping pong game, etc. This is described in greater detail hereinafter.

For playing games, two functionally different types of spots are often generated, a hit spot and a hitting spot. The hit spot simulates a ball, a hockey puck, etc. A hitting spot simulates a paddle, a hockey stick, a golf club, a hand, etc. The uses for hit and hitting spots will become readily apparent when various games are described hereinafter.

Referring now to FIGS. 11A–11D, there is illustrated yet another electronic function which is included in the present invention.

Figure 11A:
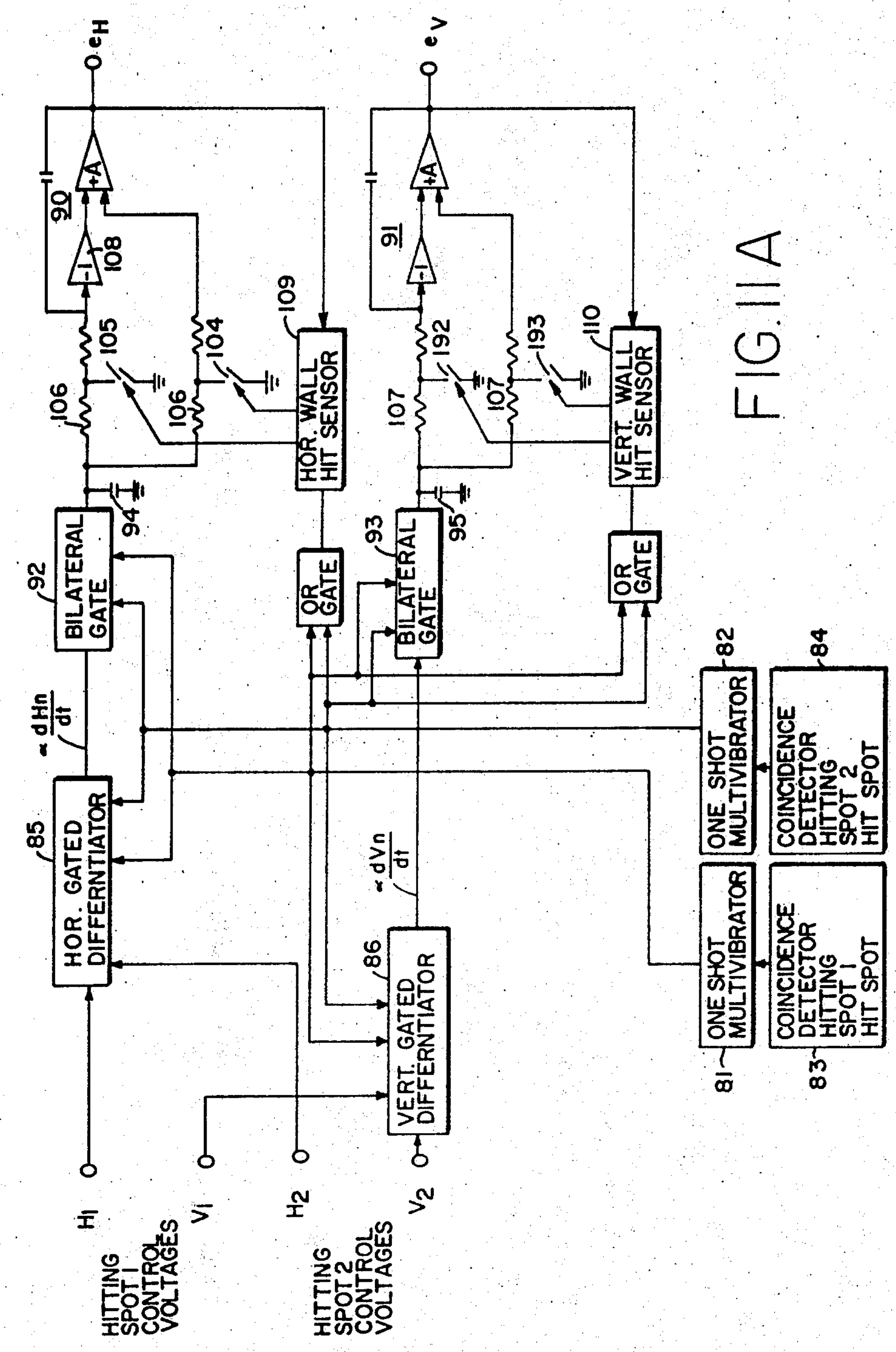
FIG. 11A is a block diagram of apparatus for controlling a "hit" spot.
Figure 11C:
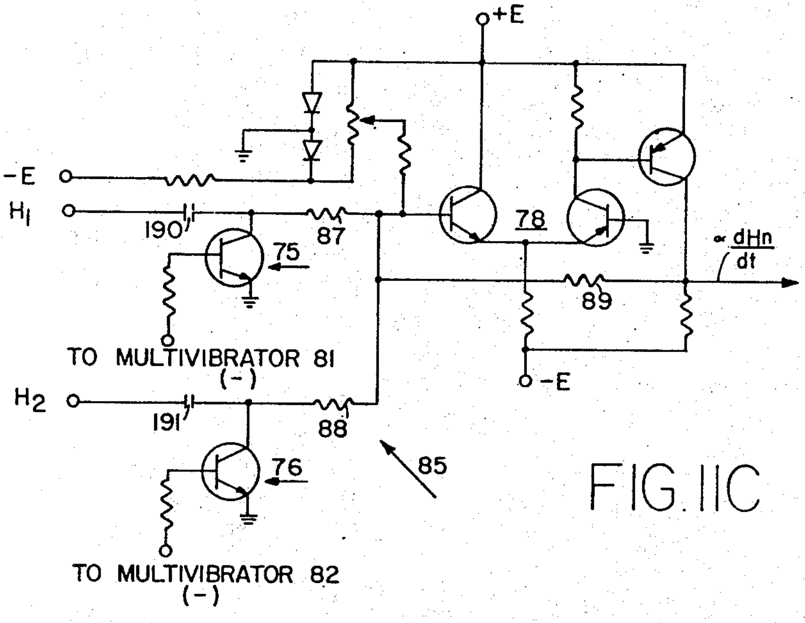
FIG. 11C is a schematic of the horizontal gated differentiator of FIG. 11A.
Figure 11B:
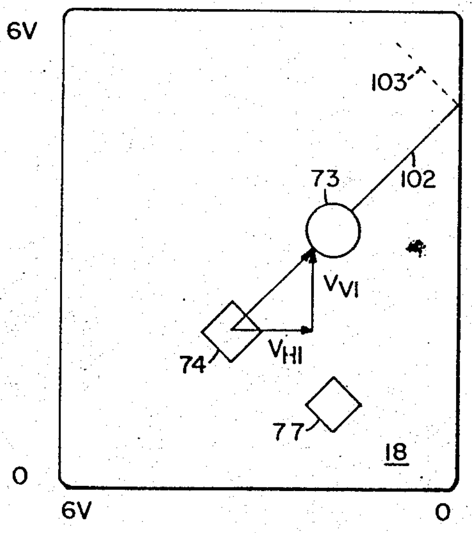
FIG. 11B is a sketch illustrating the manner in which the apparatus of FIG. 11A controls a "hit" spot; supplies

This electrical function provides the $e_H$ and $e_V$ spot positioning voltages to a hit spot such as spot 73 in FIG. 11B. These voltages, the outputs of the circuit of FIG. 11A, are applied to the horizontal and vertical slicers of the hit spot generator. The inputs to the circuit of FIG. 11A are the control voltages of a hitting spot, for example, spot 74 or spot 77 of FIG. 11B. The embodiment shown is for applications having two hitting spots which could represent, for example, two ping-pong paddles in a simulated ping-pong game.

The hitting spots horizontal control voltages are applied to a horizontal gated differentiator 85 and the hitting spots' vertical control voltages are applied to a vertical gated differentiator 86. Each of the gated differentiators has as further inputs thereto outputs from a pair of one shot multivibrators 81, 82. The multivibrators 81, 82 are triggered by outputs from a pair of coincidence detectors 83, 84, respectively. Coincidence detector 83 signifies coincidence between a first hitting spot, for example, spot 74, and the hit spot, for example, spot 73. Coincidence detector 84 signifies coincidence between a second hitting spot, for example, spot 77, and the hit spot.

The gated differentiators 85, 86 provide pulses whose amplitudes are proportional to the horizontal and vertical components of the velocity of the hitting spot at the instant of contact between the hitting and hit spots. The pulse width is that of the pulses from the one shot multivibrators 81, 82. Accordingly, this causes the hit spot to travel in the direction from which it was hit and at a speed proportional to how "hard" it was hit.

A preferred embodiment of horizontal gated differentiator 85 is shown in FIG. 11C. Vertical gated differentiator 86 is constructed in like fashion. The differentiator is comprised of capacitors 190 and 191 and feedback amplifier 78. The input signals $H_1$ and $H_2$ are coupled to the differentiator. A pair of switches, 75 and 76, follow the differentiating capacitors, 190 and 191. The switches 75, 76 are normally closed. One or the other is opened by a signal from either multivibrator 81 or 82 allowing the differentiator to differentiate the input signal of the spot which makes coincidence with the hit spot. The resistors 87, 88 prevent shorting to ground of the desired signal when the other signal switch 76 or 75 is closed. Resistor 89 is the differentiating feedback resistor. The output pulse of this circuit can be positive or negative depending upon the direction of the hitting spot when it coincides with the hit spot. Using the preferred gated differentiator of FIG. 11C, undesirable overshoots and preshoots are avoided since the switching is accomplished following the differentiating capacitors rather than before them.

Referring again to FIG. 11A, to provide the control voltages for the hit spot, the signal dHn/dt must be integrated for a period of time. If the signal is integrated for a period of time equivalent to the relatively short pulse width of the one shot multivibrators, the hit spot would move only during this time and this is too fast a spot movement. Accordingly, it is desirable to "stretch" the time of spot movement, by for example, providing an RC delay to the dHn/dt signal. This would be a simple matter if dHn/dt and dVn/dt were always one polarity. However, since dHn/dt and dVn/dt can be either polarity a more complex arrangement is necessary.

When either hitting spot makes coincidence with the hit spot a coincidence pulse from multivibrators 81 or 82 allows the bilateral gates 92 and 93 to pass positive or negative dHn/dt and dVn/dt pulses to stretching capacitors 94 and 95, respectively. After the coincidence pulse ends, the bilateral gates return to their open or high impedance state and the voltage on capacitors 94 and 95 delay at a rate determined by the capacitors and resistors 106 and 107.

The stretched pulses at capacitors 94 and 95 are coupled to integrators 90 and 91. The outputs of the integrators are voltages $e_H$ and $e_V$. These voltages become the control voltages for the hit spot.

The resultant effect is that the hit spot moves in the same direction in which the hitting spot is moving when coincidence is made. If hit hard, the hit spot moves rapidly and far. If the hitting spot is moving slowly at coincidence, the hit spot is merely "nudged" a short distance and moves slowly.

In the embodiment illustrated, a wall-bounce feature is included. When the hit spot is to travel, for example, along the line 102 (see FIG. 11B), switch 104 is open and switch 105 is closed and the signal bypasses on inverter 108. When the hit spot reaches the edge of the TV screen, it is desired that it "bounce" back as shown by line 103 of FIG. 11B, simulating, for example, a puck bouncing off the wall of a rink in a simulated hockey game or a billiard ball bouncing from a cushion. The hit spot bounces from the sides of the screen with a reflection angle equal to the incidence angle. When the spot reaches the edge of the screen, switch 104 closes and 105 opens. The signal from the bilateral gate is thus now applied to the integrator via inverter 108. A horizontal or vertical wall sensor 109, 110, as the case may be, provides the requisite signal to cause the switching of switches 104, 105 and 192, 193.

Note, in the event the wall bounce feature is not required, the horizontal system of FIG. 11A may be modified by deleting switches 104, 105, inverter 108 and the horizontal wall hit sensor 109, like components also being deleted from the vertical system.

Figure 11D:
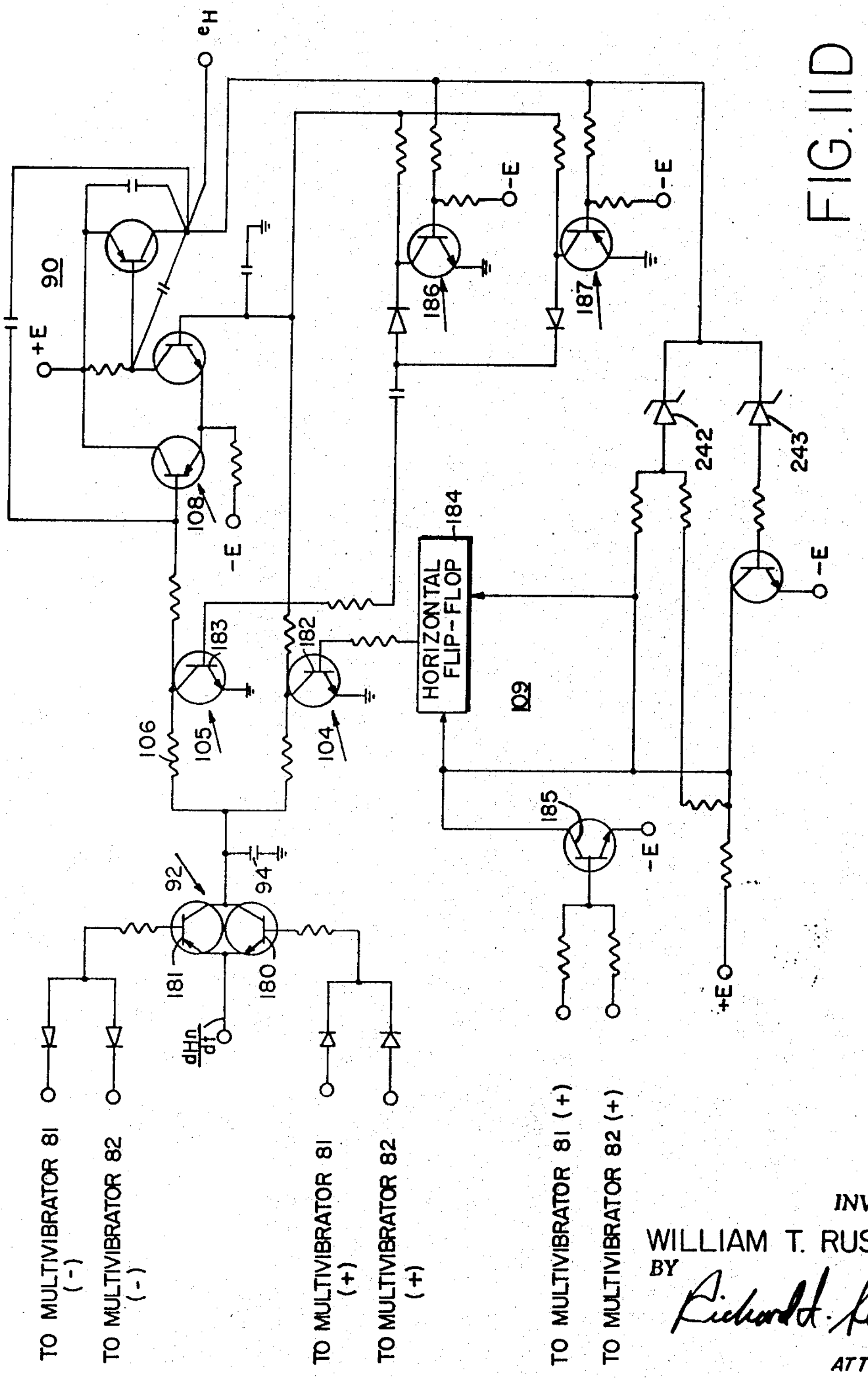
FIG. 11D is a schematic of the bilateral switch, integrator and wall bounce control of FIG. 11A.

The bilateral gate 92, integrator 90 and horizontal wall bounce circuitry is shown in greater detail in FIG. 11D. Like circuitry is also provided for the vertical portion of the system.

The differentiated signal pulse dHn/dt is applied to bilateral gate 92 which is comprised of a pair of transistors 180, 181. Signals indicative of coincidence between a hitting and hit spot are obtained from the two sides of the coincidence multivibrators and are applied to the bases of the transistors as shown, negative pulses turning 181 on and positive pulses turning 180 on. The switches 104, 105 of FIG. 11A are comprised of transistors 182, 183, respectively. The output hitting spot control signal $e_H$ is obtained at the output of integrator 90.

The output from integrator 90 is also applied to horizontal wall hit sensor 109 which comprises a pair of zener diodes 242, 243 which cause the switching of a flip-flop 184 when voltage is reached equivalent to off-screen voltage (for example, 0 volts or +6 volts). Initially, flip-flop 184 is set to a given state upon coincidence between either hitting spot and the hit spot by an output from transistor 185 to insure correct direction of the hit spot. If the flip-flop were in the wrong state, the hit spot would move 180° from the desired direction.

The circuits 186 and 187 are provided to prevent oscillation of the flip-flop 184 and failure to flip correctly which can occur if the hit spot approaches an off-screen position very slowly such that only a poor rise time signal is available to trigger the flip-flop.

With voltage control of a spot's horizontal and vertical position it is obvious that it's motion is similar to that of a spot on an oscilloscope. Thus, the TV spot can be made to follow any path that can be made on an oscilloscope.

One example of this is Lissajous patterns. Phase displaced sinusoids used for horizontal and vertical positioning (applied as the $e_H$ and $e_V$ inputs to the spot slicers) result in spot paths of circles, ellipses, "figure eights," etc.

As previously mentioned, spot size and configuration may be altered. For example, the shape of a spot can be changed to simulate 3D effects (e.g., a bowling ball which gets smaller as it rolls down the alley). This is accomplished by varying the threshold potentiometer 53 of the coincidence gate of FIG. 8. This can be readily accomplished electronically by a varying voltage input.

In certain embodiments a hollow spot or ring may be desired and this can be readily achieved by inverting the "non-square" pulses at the base of shaper 55 of FIG. 8 and subtracting from the original pulses to "hollow" them out.

Other electronic functions which may be generated are negative video, pumping action, kaleidoscope effects, even-odd spot displacements and slave spots. These will now each be described in detail.

In certain gaming applications such as simulated hockey it is desirable to use a black spot (e.g. for a hockey puck). This is accomplished by inverting the video signal.

Colored spots can be generated by applying the video signal to the phase shifter portion of the chroma generator via, for example, a variable resistor.

If a pulse generator running at an integral multiple of 15.750 kc is synchronized with the horizontal sync signals and the pulses fed to the video summation stage, a background of black and white vertical columns is obtained. If the horizontal video signal from a "spot" is used to synchronize the pulse generator, the columns can be moved from side to side. Horizontal bars can be similarly obtained with a 60 cps pulse generator.

Coincidence gating the vertical columns with the horizontal bars so that the screen is brightened only where they cross one another yields a "checkerboard" pattern of bright squares or rectangles on a dark background; inversion of the signal of course give black squares on a white background.

When the horizontal and vertical positioning voltages of a spot are obtained from nominal quadrature sinusoids, various different patterns are obtained as the sinusoid frequency and phase shift are changed. Some patterns are stationary; others have motion; some are a combination. The effect is somewhat similar to that of a stroboscope or a kaleidoscope.

If the output of a photosensor is fed to a flip-flop the sensor and directed toward a bright spot on the TV set; even-odd "-spot discernment" is obtained. This flip-flop is reset each time so that side A is high. When the spot comes on, the flip-flop flips at the 60 cps vertical scan rate. If the spot remains on for an even number of scans, side A of the flip-flop is high when the spot is removed. If the spot is on for an odd number of scans, side A stays low when the spot is removed. Thus, a coded spot, visually identical to others, can be discerned electronically. The flip-flop can, of course, ring a bell, light a light, etc.

Normally, the vertical and horizontal current pulses of a spot are coincidence gated as shown in FIGS. 5 and 8 in the coincidence gates 40 and 43.

If the vertical pulse of one spot is coincidence gated with its own horizontal pulse and with the horizontal pulse of a second spot, then a third spot appears. It is called a "slave" spot because its horizontal position is controlled by one of the "real" spots and its vertical position by the other. Obviously, with two real spots two slave spots are easily generated.

The material which follows contains a description of typical games which can be played using the electronic functions set forth above. These games are only exemplary of the many games which can be played and are set forth to merely illustrate some of the ways in which the various electronic functions are combined.

Figure 12A:
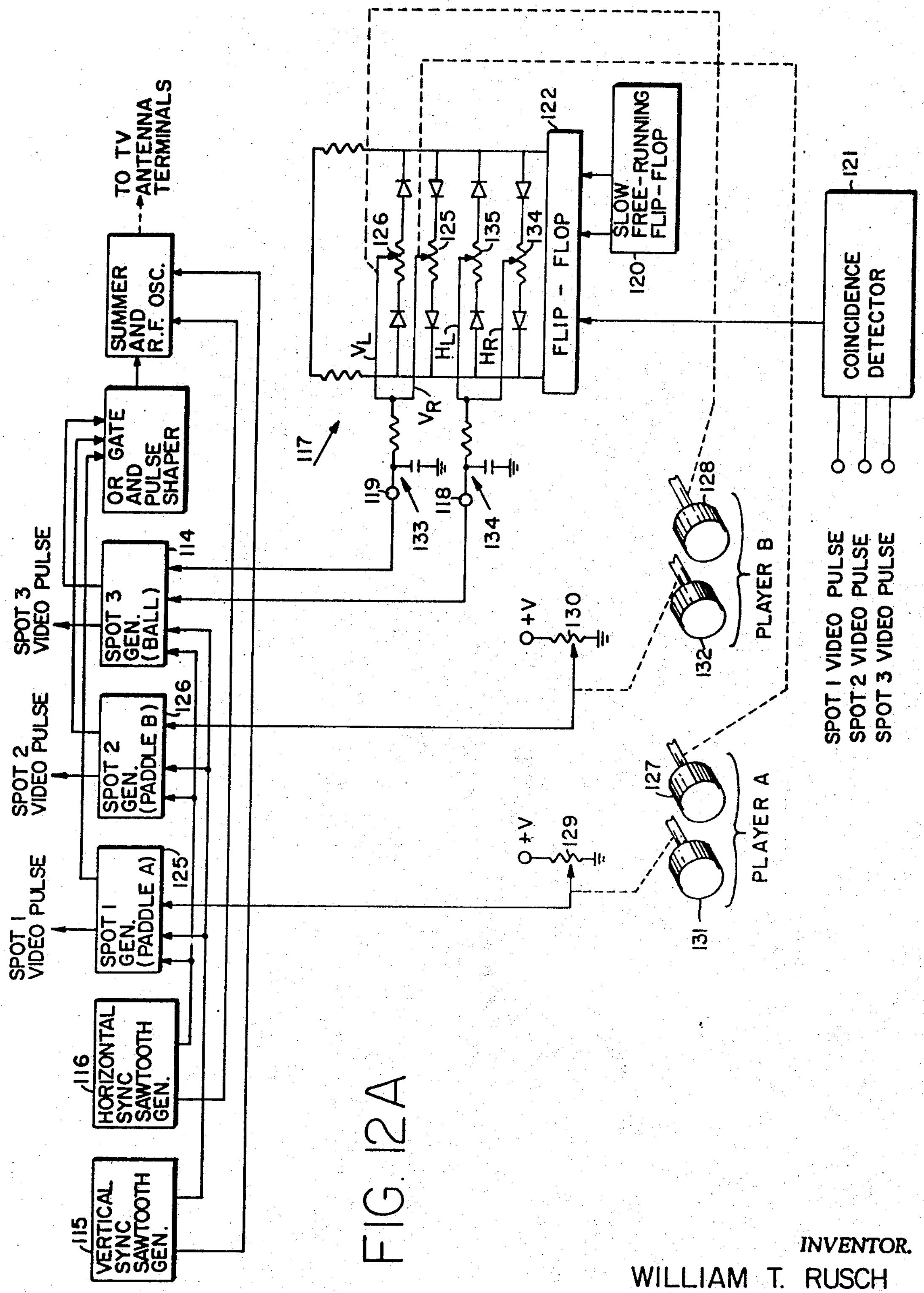
FIG. 12A is a diagram of apparatus for a simulated ping-pong game.
Figure 12B:
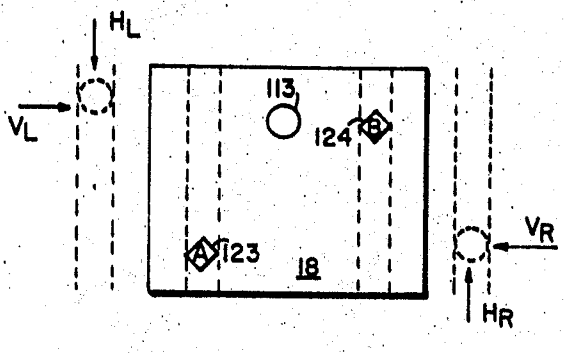
FIG. 12B is a sketch of a TV screen illustrating the manner of play of the ping-pong game of FIG. 12A.

One typical game is a simulated ping-pong game and this is illustrated in FIGS. 12A and 12B.

The simulated ping-pong ball 13 is generated by spot 3 generator 114 which has inputs thereto from vertical sync/sawtooth generator 115 and horizontal sync/sawtooth generator 116 (of the type set forth in FIG. 7). The spot generators are similar to those set forth in FIG. 8. The control voltages for the horizontal slicers of spot 3 generator 114 are derived from a flip-flop positioner 117 of the type described in FIG. 10A. Flip-flop positioner 117 provides control voltages at outputs 118, 119 which move the ball between off-screen positions $H_L$, $V_L$, and $H_R$, $V_R$. Flip-flop positioner 117 is controlled by a slow free-running or "serve" flip-flop 120 and by the output from a coincidence detector 121. In one state flip-flop 122 will serve the ball from off-screen left to off-screen right and in the other state from off-screen right to off-screen left. The output from coincidence detector 121 is used to switch flip-flop states when the ball is hit by one of the two simulated paddles. The serve flip-flop 120 is coupled to both sides of flip-flop 122. With this arrangement, if a paddle hits the ball first, the serve flip-flop cannot retrigger flip-flop 122 until the ball goes off screen on the other side of the screen.

The inputs to coincidence detector 121 are the spot 1 (paddle 123) video pulse, the spot 2 (paddle 124) video pulse and the spot 3 (ball 13) video pulse which are derived from the respective spot generators 125, 126 and 114. The video pulses are obtained from the outputs of the coincidence gates of the spot generators, for example, the output of coincidence gate 40 of the spot generator shown in FIG. 8.

The $V_R$ and $V_L$ off-screen positions of ball 113 are controlled by players A and B, respectively, by adjustments of potentiometers 125, and 126 via knobs 127 and 128, respectively.

The vertical position of paddles A and B are determined by the setting of potentiometers 129 and 130 which provide the vertical control voltages to the vertical slicers of the spot 1 and spot 2 generators 125, 126, respectively. Knobs 131 and 132 control the potentiometers 129, 130.

This simulated ping-pong game is played as follows:

The ball 113 is connected, with RC time constants 133, 134 to the flip-flop 122 which moves the ball between off-screen positions $H_L$, $V_L$, and $H_R$, $V_R$. The RC time constant prevents instantaneous spot motion. Additionally, since the resulting velocity is exponential in nature the spot starts fast and slows down; by moving the potentiometers 134, 135 which control $H_R$ and $H_L$, in toward the screen the ball's motion is fairly slow. Moving $H_R$ and $H_L$ out gives a faster game.

Assume the ball is at $H_L$, $V_L$, it is served automatically when the free-running flip-flop 120 flips. The ball proceeds towards $H_R$, $V_R$. Player B moves paddle B vertically (by turning knob 132 connected to potentiometer 130) to try to hit the ball. If he misses it he loses a point as it goes off-screen right (where it will be served automatically again by the free-running flip-flop).

However, if he hits the ball it bounces off his paddle and starts left toward $H_L$, $V_L$. Now he has control of its' flight, and by adjusting $V_L$ with his other hand (by turning knob 128 connected to potentiometer 126) he can send the ball up or down and even try to "wiggle" it around player A's paddle.

Player A controls the vertical motion of paddle A (by turning knob 131 connected to potentiometer 129) and, if he hits the ball, gains control of its path by adjusting $V_R$ (by turning knob 127 connected to potentiometer 125).

Play can be made fast or slow by setting $H_L$ and $H_R$ (potentiometer 135, 134) or by setting the paddles in different horizontal positions (by adjusting potentiometers within the generators 125, 126).

When color is used, the ball and paddles are white, the "table" green. Overlays or TV or CATV backgrounds showing a lined table and net enhance the effect. The game can be played by two man teams. One man controls the paddle, the other man the path of the ball.

By modification of the embodiment of FIG. 12, a game of gun ping-pong can be played. In this embodiment the players use light sensor guns instead of paddle spots to hit the ball back and forth. An output from the light sensor is used to trigger flip-flop 122 instead of coincidence detector 121. The control knobs 131 and 132 are not required. Whereas, it is difficult for one man to aim a gun and control a potentiometer, the game is best with two man teams. One man shoots; his partner controls the ball's path. Or, if a pistol is used a player can shoot with one hand and use a potentiometer with the other. Or, a ramdom or pseudo-random electronic change of $V_R$ and $V_L$ can be used.

Illustrative electronics for performing this "gun" function is illustrated in said patent application 126,966. A light sensitive cell is contained, for example, within the barrel of a gun and used to trigger an SCR. A switch is provided for resetting same.

Figure 12C:
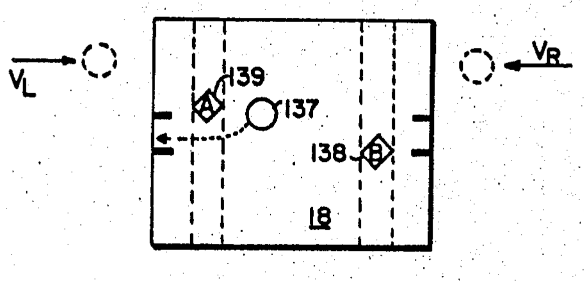
FIG. 12C is a sketch of a TV screen illustrating the manner of play of a simulated hockey game using the apparatus of FIG. 12A.

A simple hockey game can be played which uses the same mechanics (FIG. 12A) as the above ping-pong games including the "automatic serve" flip-flop (see FIG. 12C). The paddles (now"goalies") are moved closer in toward center where the puck is moving faster.

If player B (with spot 138) hits the puck 137 it moves to the left and he controls its path by moving $V_L$. He trys to "wiggle" the puck around goalie A (spot 139) and into the goal.

Player A controls $V_R$ after he hits the puck.

In color TV application, it is preferred to use white goalies, a black puck (using negative video) and blue ice.

Again, this game is adaptable to two man teams, and even more if more spots are used.

Figure 12D:
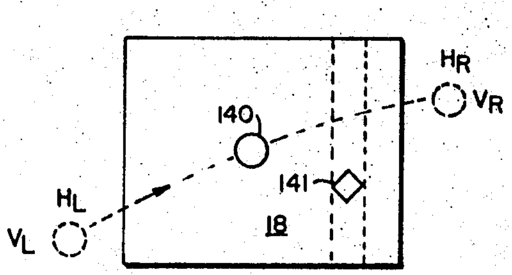
FIG. 12D is a sketch of a TV screen illustrating the manner of play of a simulated baseball game.

Another game which can be played using most of the system shown in FIG. 12A is a simulated baseball game. This is illustrated in FIG. 12D.

The pitcher controls the path of a ball 140 by adjusting knobs 127 and 128 connected to potentiometers 125 and 126 which, therefore, controls $V_L$ and $V_R$. The ball, therefore, goes from position $H_L$, $V_L$ to $H_R$, $V_R$.

Another knob (not shown) is connected to potentiometer 134 and thereby permits speed control by the pitcher.

The batter tries to hit ball 140 by moving bat 141 (spot 2) vertically by turning knob 132. Spot 1 is not required for this game. If the batter connects, the ball will be hit left, back to position $H_L$, $V_L$. If the batter misses, the ball will be automatically returned as in the above games.

In an alternate embodiment, the free-running serve flip-flop 120 can be eliminated and a pushbutton set and reset of flip-flop 122 can be used for manual "pitch" and reset.

Figure 13:
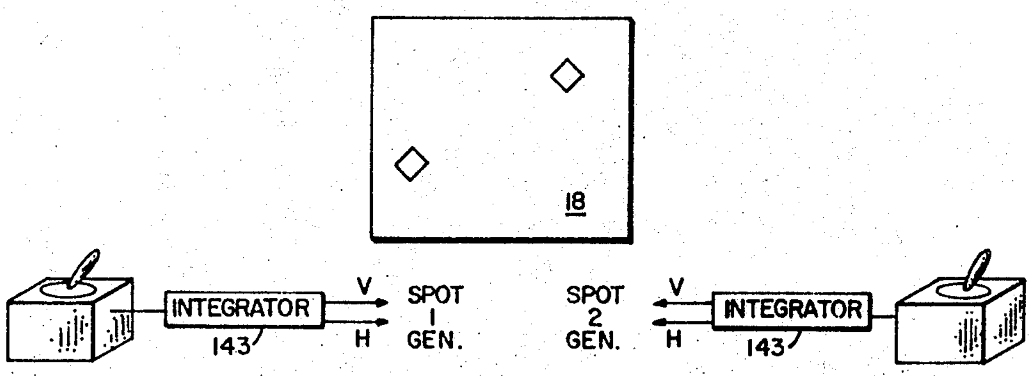
FIG. 13 is a sketch illustrating a class of games ("chase" games) which can be played using the apparatus of this invention.

One class of games makes use of the electronic function illustrated in FIG. 9C and is shown in FIG. 13. This class of games requires one or more joystick controls 142 coupled to integrators 143. The outputs from the integrators are applied to the horizontal and vertical slicers of their respective spot generators. With this set-up race games, etc., may be played. The somewhat sluggish "spongy" effect of the integrator and the non-return to center requires more skill of the players than a "straight control" joystick.

Of course, appropriate backgrounds or overlays can be employed. A third (or more) "obstacle" spot can be used. If a player hits it, the coincidence pulse can be used to make all spots disappear or to change screen color, etc., as described in said patent application Ser. No. 126,966. For chase games, coincidence of the pursuer and pursued can do the same thing.

Figure 14:
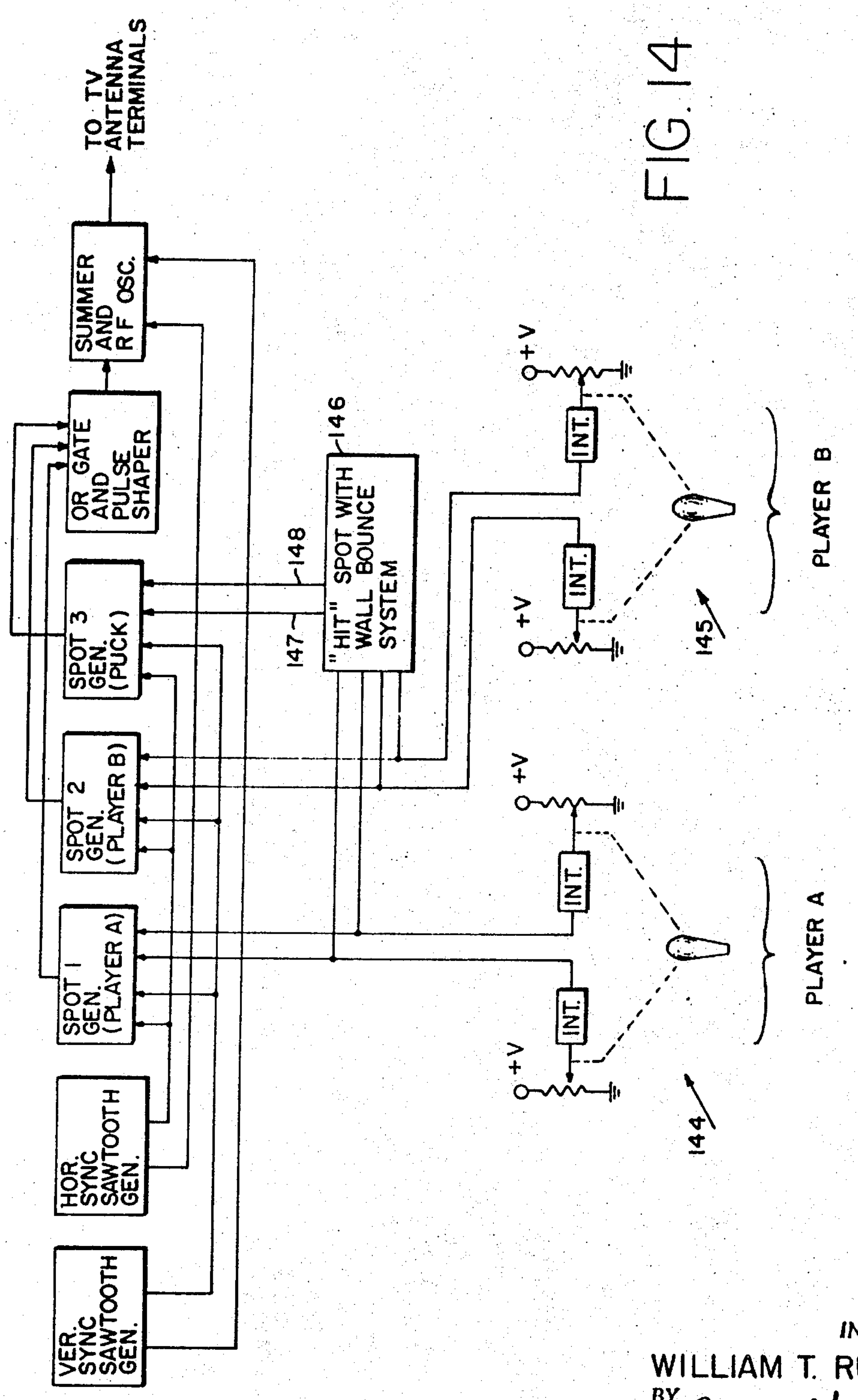
FIG. 14 is a diagram of apparatus for a simulated hockey game.

A more sophisticated hockey game than that described with respect to FIG. 12C may be played employing the circuits previously set forth. This game is set forth in FIG. 14. The vertical and horizontal sync/ sawtooth generators, the spot generators, the OR gate and pulse shaper and the summer and RF oscillators serve the same function as previously described. The control voltages to the horizontal and vertical slicers of the spot 1 generator are obtained from the outputs of a joystick integrator 144 of the type illustrated in FIG. 9C and the control voltages for the slicers of the spot 2 generator are obtained from the outputs of a second joystick integrator 145.

The control signals for the horizontal and vertical slicers of the spot 3 generator are obtained at the outputs 147, 148 of hit spot and wall bounce system 146. Hit spot and wall bounce system is shown in detail in FIG. 11. The inputs to the system 146 are the respective outputs of the joystick integrators 144 and 145.

With two players on joystick integrators 144, 145 and a puck which moves "in direction hit," a realistic hockey game results. The semi-sluggish response of the integrators gives an effect similar to real hockey players gliding on ice. They can't stop or reverse direction instantaneously. The puck can be nudged along if hit easily of sent fast if hit rapidly. It may be noted here that the "ball moves in direction hit" function derives the hitting from differentiation of the hitting spot's positioning voltages. It comes as a surprise to a player "standing still guarding his goal" when the puck glides right through his stationary defending spot.

If the puck is hit very hard, it may bounce off several sides of the screen before stopping. With the sluggish joystick integrator spots and the bounce from screen sides, a player must anticipate the "bounce." He cannot usually go right after the puck, but must move to a spot which he anticipates the puck will pass after bouncing. This game may be simplified somewhat by deleting the wall bounce feature in the manner hereinbefore described.

A simulated handball game is achieved when the player's spots are on straight control joysticks without integrators (as shown in FIG. 9B). The hit spot with wall bounce system of FIG. 11 is employed to supply the hit spot or ball generator's slicer control voltages with one minor variation. One of the comparator reference voltages is deleted so that the hit spot or ball will not bounce off the bottom of the screen.

Wall bounce is used on screen top, right and left. Player A hits ball. It must hit front (top) wall sometime during its flight. Player B tries to hit ball. If he misses ball, it disappears off-screen bottom, he loses a point and ball is then automatically served from off-screen after a certain length of time by using a flip-flop arrangement like that shown in FIG. 10 in conjunction with a slow free-running flip-flop for automatically triggering same or a push button trigger for manual reset.

Figure 15A:
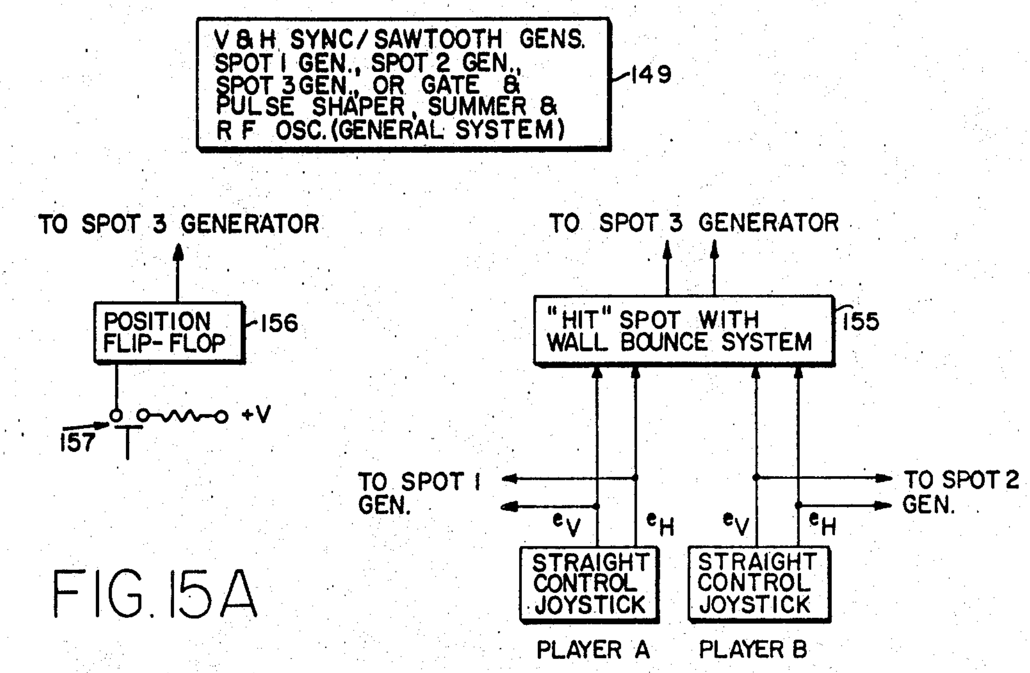
FIG. 15A is a diagram of apparatus for a simulated handball game.
Figure 15B:
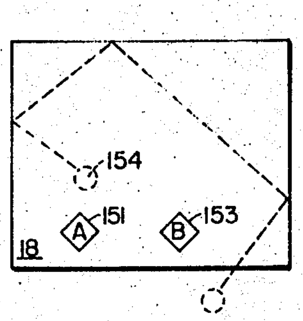
FIG. 15B is a sketch of a TV screen illustrating the manner of play of a simulated handball game using the apparatus of FIG. 15A.

This handball game is illustrated in FIGS. 15A and 15B. The general system electronics 149 is the same as shown in FIG. 12A. The control voltages for the slicers of spot 1 generator are obtained from a straight control joystick 150 (see FIG. 9B). Spot 1 generator generates the spot 151 representing Player A. A second straight control joystick 152 provides control voltages for Player B, spot 153. The ball or hit spot 154 is generated by spot generator 3 and receives its slicer control voltages from a hit spot and wall bounce system 155, which is similar to that of FIG. 11A; however, comparator 111 does not have a 0 reference level so that the ball will bounce off all the walls but the bottom one. A position flip-flop 156 similar to that of FIG. 10A is used to return the ball to the "playing area" but being triggered from a switch 157. Alternatively, a slow free-running or serve flip-flop could be employed as described hereinbefore.

Figure 16B:
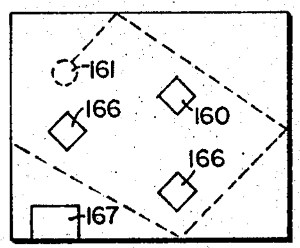
FIG. 16B is a sketch of a TV screen illustrating the manner of play of a pinball game using the apparatus of FIG. 16A.
Figure 16A:
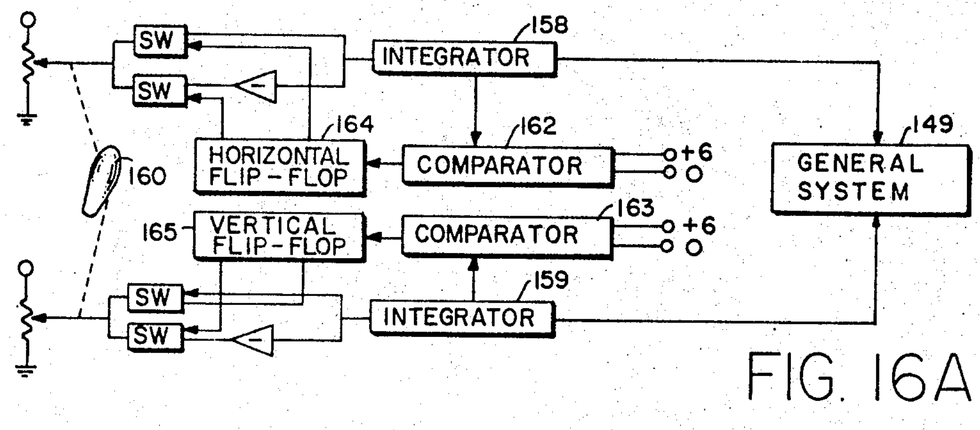
FIG. 16A is a diagram of apparatus for a simulated pinball game.

FIGS. 16A and 16B illustrate a simulated pinball game. The spot 3 or ball generator receives its vertical and horizontal slicer control voltages from a pair of integrators 158 and 159. Note in this application the spot 1 and 2 generator of general system 149 are not required. The player operates a joystick to cause ball 161 to move. The ball keeps moving as long as the joystick is off the center position. The ball will bounce off the walls or edges of the screen since a pair of comparators 162 and 163 will cause a pair of flip-flops 164 and 165 to change the direction of the ball by reversing the polarity of the signals applied to integrators 158, 159 in the manner previously described when discussing the circuit of FIG. 11.

Various "scoring" spots are placed on the screen by overlays, electronically, etc., as is a game end zone 167. Play is commenced by a player "throwing" joystick 160 in some off center position and removing his hand. Ball 161 then keeps moving. When it hits a side wall it bounces, when it hits scoring spots points are scored. Play continues until ball happens to go into "game end" zone 167.

Score is observed visually. However, the scoring spots can be generated electronically by additional spot generators and score made on occurrence of coincidence using a coincidence detector of the type described hereinbefore.

Figure 17A:
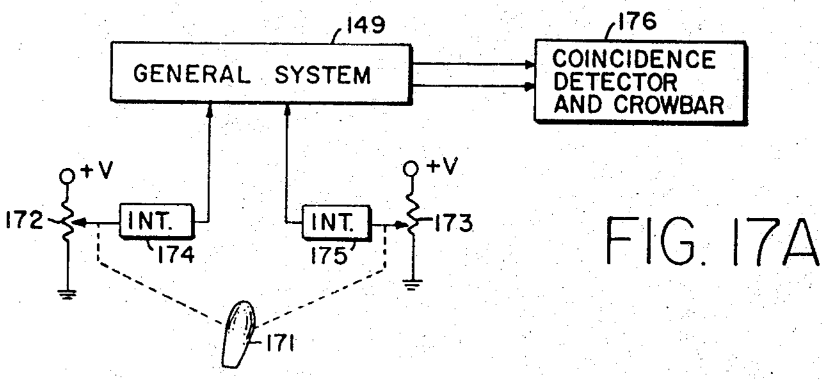
FIG. 17A is a diagram of apparatus for a simulated bowling game.
Figure 17B:
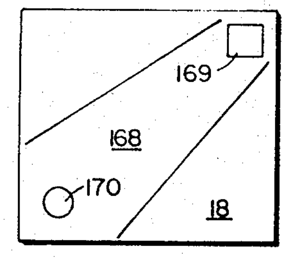
FIG. 17B is a sketch of a TV screen illustrating the manner of play of a bowling game using the apparatus of FIG. 17A.

A simulated bowling game illustrated in FIGS. 17A and 17B is played by providing an "alley" 168 overlay or TV-CATV background. It should go from one corner bottom screen to opposite corner top screen, narrowing to give a 3-D effect. One or more spots simulating bowling pins are at upper end of alley. One spot 169 is illustrated. Player "bowls" a ball 170 by "throwing" a joystick 171. If pin (pins) are hit, they disappear. If missed, ball just keeps going past them off the screen. Ball can be returned to start point either with joystick or an instantaneous pushbutton reset (not shown).

The joystick 171 is connected to potentiometers 172, 173 whose outputs are connected via integrators 174, 175 to the control voltage outputs to the horizontal and vertical slicers of the spot 3 generator of the generator system 149. If the ball 170 hits pin 169, coincidence detector and crow-bar circuit 176 causes the pin to disappear. One embodiment of said coincidence detector and crow-bar circuit is disclosed in said patent application Ser. No. 697,798. The ball would be made smaller as it approaches the pins by using a varying voltage as the voltage applied to the threshold set resistor. In this game the vertical control voltage would be used.

The various games illustrated above are only a few of the multitude of games which can be played using the concepts taught by this invention. The electrical functions to generate various configurations can be combined in any number of possible ways. For example, a golf putting game can be played over a green background using a black negative video hole. A small white spot can be used as the golf ball and larger white spot used as the putter. The putter spot can be controlled by a straight joystick of the type illustrated in FIG. 9B. The ball can be controlled from circuitry like that shown in FIG. 11A, preferably without the wall bounce feature. The game can be further enhanced, if desired, by coincidence pulse timing such that if ball is moving very slowly when it hits the hole it will disappear. If the ball is moving very fast, it will go right across the hole.

A simpler version would not require coincidence circuitry. If the ball comes to rest over the hole, the ball's negative video signal overrides the ball's positive video and blanks out the ball.

In another example, cushion billiards can be played. The player's balls are on straight control joysticks (see FIG. 9B). Third ball is hit using control of FIG. 11A. Wall bounce is used on all four sides. Player hits a third ball. The latter must hit at least one cushion first and then hit opponent's ball to score a point.

For skilled players, the third ball must hit two cushions first; and the game can be elaborated to three cushion billiards.

Maze games can also be played using the various features. TV screens are not large enough to permit a normal "line type" maze. The "correct" path through the maze is too obvious. Therefore, a "number maze" was devised. An overlay or background divided into rectangles is used. A number is in each rectangle.

One of two players is designated as EVEN, the other as ODD. EVEN moves his spot (or ring) so that the sum of his and opponent's numbers is even. ODD moves so as to make the sum ODD.

The resulting coded pattern of moves enables the maze designer to keep the two players on separate paths or on shared paths. The maze paths are drawn first and the numbers and then inserted. Mazes can be simple or complex, containing many false paths and dead ends. Normally, moves are one space at a time horizontally or vertically.

As a variation, if one player can land on the same number his opponent occupies elsewhere, he takes an extra move. (ODD is permitted to do this also even though in so doing he makes a temporarily even sum).

Unless a large number of rectangles are used, the maze designer is limited when trying to keep players on separate isolated paths.

Considerably more pattern flexibility results if one path can jump across another. This is accomplished by jumps between identical numbers with one space in between them. For example, if a player is on a 2 and needs to move to an odd number such as 7, after he moves to the 7 he can jump a space in horizontal or vertical directions to another 7. Multiple jumps are permitted and can be incorporated in the maze.

More intricate and interesting patterns can be laid out if a three term sum is used, i.e., players make the sum of the two numbers they occupy and the one they intend to move to be even or odd accordingly.

An easier version of this is done with colors. The "code" available to the designer is the same. If red and white rectangles are used, for example, the "rule" for both players is simply "move to red, unless both on red."

A simple "ghost" game can be played wherein a lettered background or overlay is used. Players move spots to jointly spell a word. Player ending a word loses a point.

A spell check game is played by putting letters in columns. Players advance a column if they can add a letter to a jointly spelled word. They drop back one or more columns if they can find an appropriate letter only there.

As mentioned before, the control units or any parts thereof can be built into a television receiver as a constituent part thereof rather than be a separate unit and coupled to antenna terminals as described above. In other embodiments some of the elements contained in the gaming apparatus can be eliminated and replaced by some of the functions which are already provided in conventional television receivers.

Figure 18A:
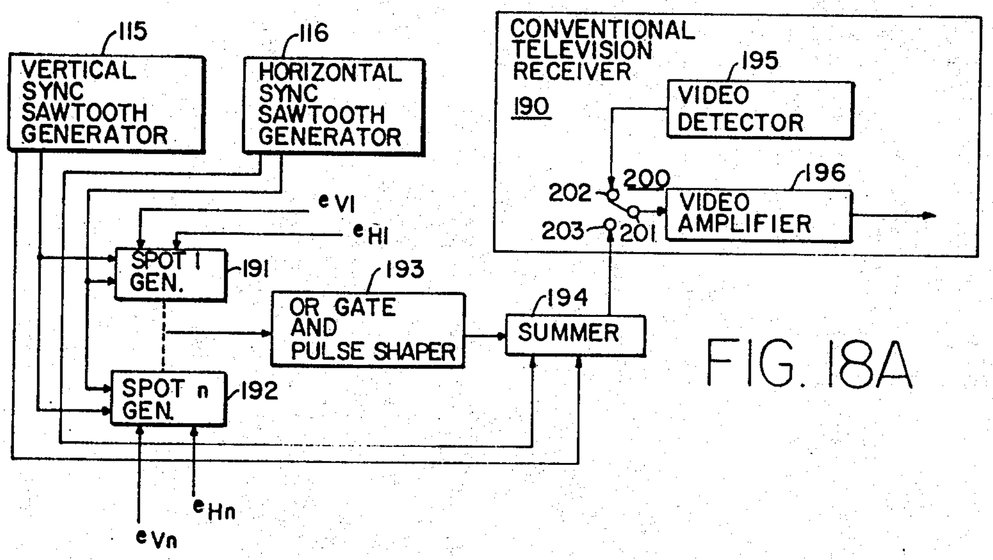
FIGS. 18A–18C are block diagrams of "built-in" embodiments of the invention.
Figure 18B:
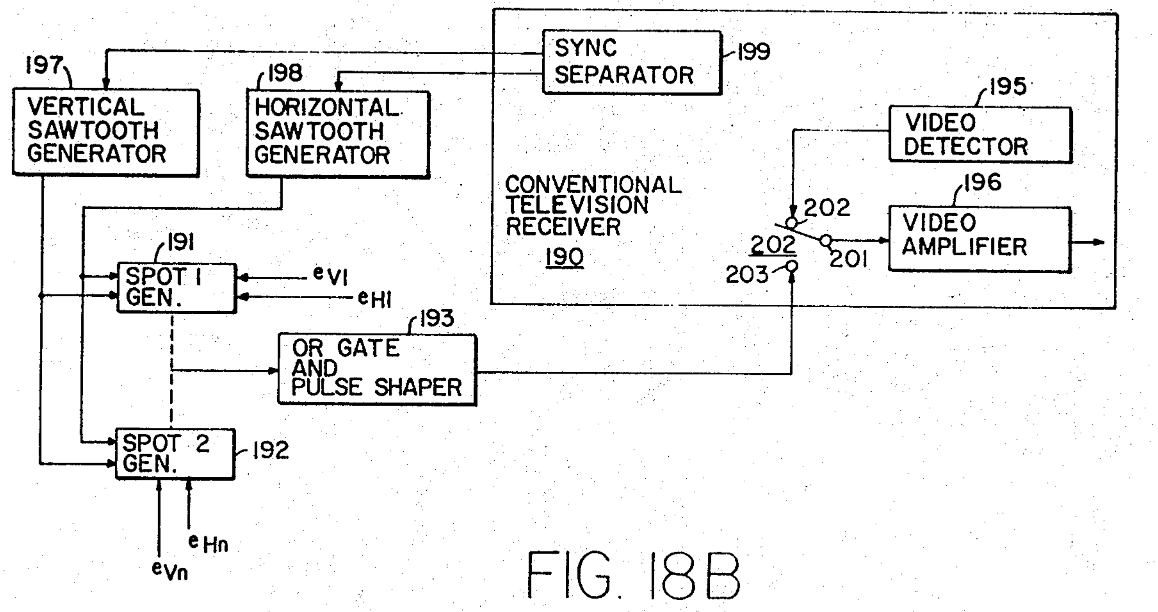
Figure 18C:
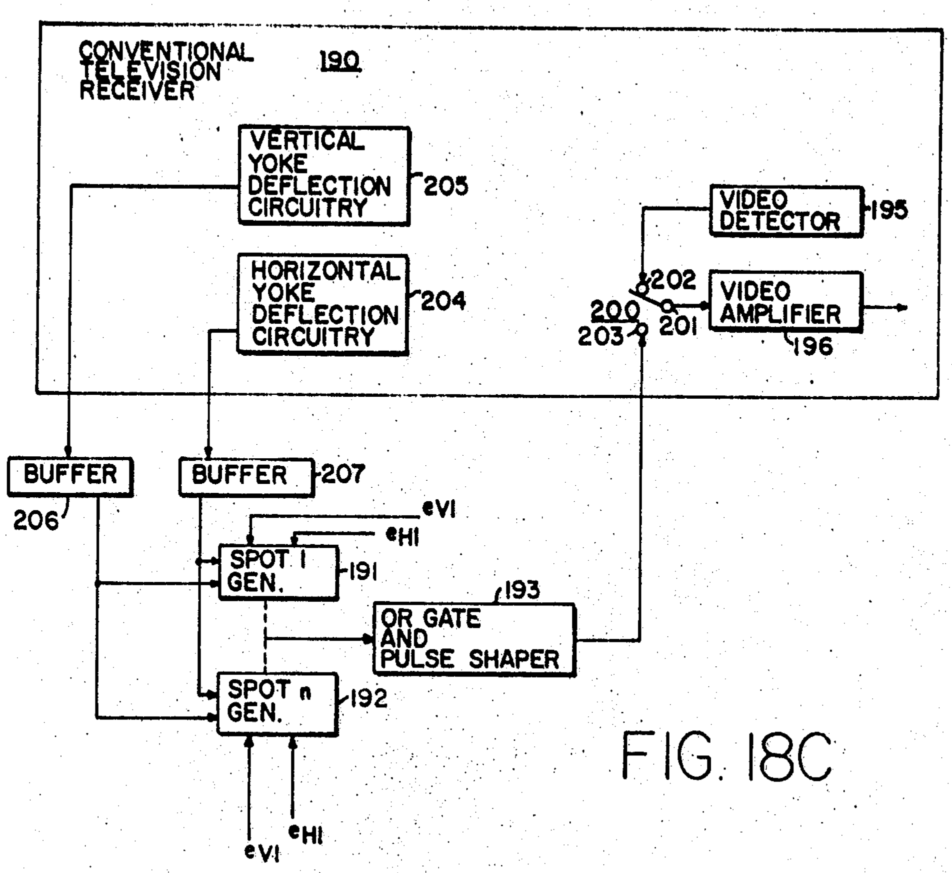

FIGS. 18A through 18C are examples of television gaming apparatus which can be built into a conventional television receiver.

Referring now to FIG. 18A, there is illustrated one embodiment of a built-in television apparatus. The entire apparatus of FIG. 18A or any parts thereof can be built into a television receiver 190. In the manner described hereinbefore, the spots are provided by spot generators 191 through 192. The spot generators receive inputs from the vertical sync/sawtooth generator 115 and the horizontal sync/sawtooth generator 116. The voltage control inputs to the spot generators can be derived from a potentiometer or a potentiometer in connection with an integrator or outputs of other spot generators etc. In other words, the voltage control inputs can be any and all voltage control inputs described hereinbefore.

The outputs from the spot generators are applied via an OR gate and pulse shaper 193 to a summer 194. Summer 194 also receives the sync outputs from the vertical sync/sawtooth generator 115 and the horizontal sync/sawtooth generator 116. Summer 194 is different from the summers previously described in that no RF oscillator or separate modulator is required since the output therefrom is coupled internally directly to the video circuitry of the TV receiver 190.

The output from summer 194 is connected to, for example, a contact 203 of a switch 200. The center arm 201 of switch 200 is coupled to the video amplifier 196 of the conventional TV receiver 190. Another contact 202 of switch 200 is coupled to the video detector of the conventional TV receiver 190. In this manner receiver 190 can be switched from the video detector or passive viewing mode of operation (to receive broadcast programs) to the summer or active mode of operation.

In certain embodiments, it is necessary to connect both contacts 202 and 203 to the video amplifier, where, for example, the active mode TV receiver will be used in conjunction with broadcast programs which broadcast background or other information. Broadcast is used herein in the broadest sense to include programs generated by a CATV station, programs generated by a closed-circuit TV arrangement information generated by a video tape recorder and by a slide projector. Many of the symbol generations herein described can be superimposed upon backgrounds generated by a broadcast station and games played in conjunction therewith.

Of course, the other systems previously described can also be built into the TV receivers with the outputs therefrom applied to the antenna input of the TV receiver.

Referring now to FIG. 18B, there is illustrated another built-in TV gaming apparatus. In this embodiment the vertical sync/sawtooth generator 115 and the horizontal sync/sawtooth generator 116 are replaced by vertical sawtooth generator 197 and horizontal sawtooth generator 198 which generate merely sawtooth waves rather than sync pulses and sawtooth waves. The sawtooth generators 197 and 198 are synchronized to the sync of the conventional TV receiver 190 by a pair of outputs from a sync separator 199. In this embodiment a separate summer 194 is not required since the sync pulses are derived from the conventional receiver as broadcast by a broadcasting station and thereby external sync pulses are not required. Therefore, the input of contact 203 in this embodiment is merely the output from pulse shaper 193.

In another embodiment of a built-in TV gaming apparatus (see FIG. 18C) the sawtooths required for spot generation are derived from the vertical and horizontal yoke deflection circuits 204, 205 within the conventional TV receiver 190. Buffer circuits 206 and 207 change the current sawtooth of the deflection circuitry to voltage waveforms and provide the proper polarity and amplitude correction. Since the vertical and horizontal yoke deflection circuitry are already synchronized, no external sync is required nor is any additional internal connection required. Additionally, any waveform generated within the conventional television receiver can be utilized, where appropriate, for TV gaming symbol generation.

Figure 19:
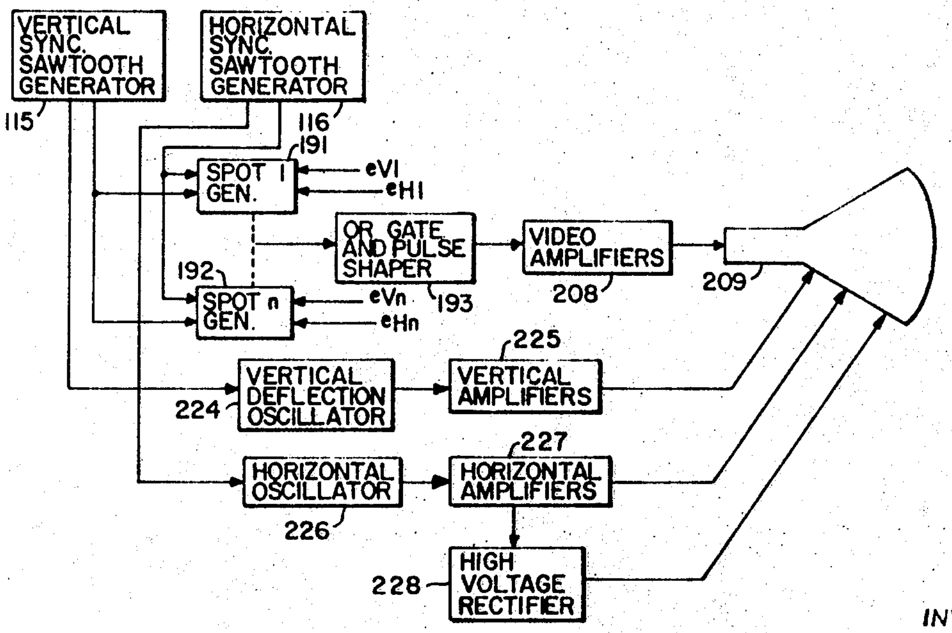
FIG. 19 is a simplified block diagram of another embodiment of TV gaming apparatus.

In a further embodiment of this invention a unit is set forth which is used solely for TV gaming and does not have capability to receive broadcast programs. This is illustrated in the simplified block diagram of FIG. 19.

The spots are provided, in the same manner as hereinbefore described, by spot generators 191, 192 which receive sawtooth inputs from the sync/sawtooth generators 115, 116 and also receive voltage control inputs $e_V$ and $e_H$. The outputs from the spot generators 191, 192 are coupled to OR gate and pulse shaper 193.

The output from OR gate and pulse shaper 193 is applied to the intensity input of a cathode ray tube 209 via a video amplifier 208. By appropriately selecting the parameters of the spot generators, appropriate video pulse size can be developed and, therefore, the video amplifiers eliminated.

The vertical sync pulses from vertical sync/sawtooth generator 115 are applied to the vertical yoke of CRT 209 via a vertical deflection oscillator 224 and vertical amplifiers 225 in known fashion.

The horizontal sync pulses from horizontal sync/sawtooth generator 116 are applied to the horizontal yoke of CRT 209 via horizontal oscillator 226 and horizontal amplifiers 227 in known fashion. The horizontal amplifier also supplies the high voltage to CRT 209 via a high voltage rectifier 228.

Thus, it is to be understood that the embodiments shown are illustrative only, and that many variations and modifications may be made without departing from the principles of the invention herein disclosed and defined by the appended claims.

I claim:

1. In combination with a standard television receiver, apparatus for generating signals representing a symbol to be displayed on the screen of said television receiver, comprising:
   - means for generating sync signals;
   - means for generating a first sawtooth wave;
   - means for generating a second sawtooth wave;
   - means coupled to said first sawtooth wave generating means for generating first current pulses proportional to a predetermined slice of said first sawtooth wave; including a first slicer having first and second diodes connected back-to-back with one junction thereof coupled to said first sawtooth wave generating means, a capacitor coupled from the other junction to ground and means for receiving a control signal at said other junction, and first means for differentiating the output from said first slicer;
   - means coupled to said second sawtooth wave generating means for generating second current pulses proportional to a predetermined slice of said second sawtooth wave; including a second slicer having third and fourth diodes connected back-to-back with one junction thereof coupled to said second sawtooth wave generating means, a capacitor coupled from the other junction to ground and means for receiving a control signal at said other junction, and second means for differentiating the output from said second slicer;
   - a coincidence gate coupled to said first and second current pulse generating means;
   - means for summing the output from said coincidence gate and said sync signals;
   - an RF oscillator;
   - means for modulating the output of said RF oscillator with said summed signal; and
   - means for applying said modulated signal to said receiver.

2. Apparatus as defined in claim 1 wherein said first and second differentiating means includes:
   - a first capacitor coupled from said first slicer to said coincidence gate; and
   - a second capacitor coupled from said second slicer to said coincidence gate.

3. Apparatus as defined in claim 1 wherein said coincidence gate includes:
   - a transistor having first, second and third electrodes, said third electrode being coupled to ground, with the output of said coincidence gate obtained at said third electrode;
   - a voltage source;
   - a first resistor coupled from said second electrode to said voltage source;
   - a second resistor coupled from said second electrode to ground; and
   - a third resistor coupled from said third electrode to said voltage source.

4. Apparatus as defined in claim 3 wherein said second resistor is a variable resistor which adjusts the threshold of said coincidence gate and thereby symbol size and shape.

5. Apparatus as defined in claim 4, further including means for generating first and second control signals which determine said predetermined slices, said control signals being coupled to said first and second slicers.

6. Apparatus as defined in claim 5 wherein said first and second control signal generating means includes:
   - first and second voltage source;
   - a first potentiometer coupled across said first voltage source, the arm of said potentiometer being electrically coupled to said first slicer;
   - a second potentiometer coupled across said second voltage source, the arm of said potentiometer being electrically coupled to said second slicer; and
   - means for adjusting the position of said arms to thereby vary said control signals.

7. Apparatus as defined in claim 6 wherein said adjusting means includes:
   - a first knob coupled to said arm of said first potentiometer; and
   - a second knob coupled to said arm of said second potentiometer.

8. Apparatus as defined in claim 6 wherein said adjusting means includes a joystick coupled to both arms of said potentiometers.

9. In combination with a standard television receiver, apparatus for generating signals representing a symbol to be displayed on the screen of said television receiver, comprising:
   - a control unit including means for generating horizontal and vertical signals representing the symbol to be displayed, means for synchronizing a television raster scan, and means for manipulating the position of the symbol on the screen, said manipulating means including means for generating first and second control signals coupled to said means for generating horizontal and vertical signals, said control signal generating means including means for causing the displayed symbol to travel back and forth between two predetermined positions off-screen; and
   - means for electrically coupling said control unit to said television receiver.

10. In combination with a standard television receiver, apparatus for generating signals representing a symbol to be displayed on the screen of said television receiver comprising:
   - a control unit including means for generating horizontal and vertical signals representing the symbol to be displayed, means for synchronizing a television raster scan, and means for manipulating the position of the symbol on the screen, said manipulating means including means for generating first and second control signals coupled to said means for generating horizontal and vertical signals, said control signal generating means including means for causing the displayed symbol to travel back and forth between two predetermined positions; and means for electrically coupling said control unit to said television receiver;

wherein said means for causing said displayed symbol to travel between two predetermined positions includes:

a bistable multivibrator having at least a first input and first and second outputs;

a first resistor;

a first diode, the anode thereof being coupled to one side of said first resistor with the cathode thereof being coupled to the first output of said bistable multivibrator;

a second diode, the cathode thereof being coupled to the other side of said first resistor with the anode thereof being coupled to said second output of said bistable multivibrator;

a second resistor;

a third diode, the cathode thereof being coupled to one side of said second resistor with the anode thereof being coupled to the first output of said bistable multivibrator;

a fourth diode, the anode thereof being coupled to the other side of said second resistor with the cathode thereof being coupled to said second output of said bistable multivibrator;

a third resistor;

a fifth diode, the anode thereof being coupled to one side of said third resistor with the cathode thereof being coupled to the first output of said bistable multivibrator;

a sixth diode, the cathode thereof being coupled to the other side of said third resistor with the anode thereof being coupled to said second output of said bistable multivibrator;

a fourth resistor;

a seventh diode, the cathode thereof being coupled to one side of said fourth resistor with the anode thereof being coupled to the first output of said bistable multivibrator;

an eighth diode, the anode thereof being coupled to the other side of said fourth resistor with the cathode thereof being coupled to the second output of said bistable multivibrator;

means for applying triggering pulses to said first input of said bistable multivibrator;

means coupling said third and fourth resistors for providing a first control signal; and means coupling said first and second resistors for providing a second control signal.

11. Apparatus as defined in claim 10 wherein said trigger applying means includes a slow free-running bistable multivibrator.

12. Apparatus as defined in claim 11 wherein the output from said slow free-running bistable multivibrator is also applied to a second input of said bistable multivibrator.

13. Apparatus as defined in claim 10 wherein said resistors are variable.

14. Apparatus as defined in claim 10, further including:

a first RC network coupled to said means coupling said first and second resistors; and a second RC network coupled to said means coupling said third and fourth resistors.

15. Apparatus as defined in claim 10, further including:

a first integrator coupled to said means coupling said first and second resistors; and a second integrator coupled to said means coupling said third and fourth resistors.

16. Apparatus as defined in claim 5 wherein said first and second control generating means includes means for generating a first sinusoid and a second sinusoid phase displaced from said first sinusoid whereby the symbol will traverse a path such as a circle, ellipse "figure eight" etc.

17. Apparatus for generating signals representing a "-hitting" symbol and a "hit" symbol to be displayed on the screen of a television receiver, comprising:

means for synchronizing a television raster scan;

means for generating electrical signals representing a hitting symbol;

means coupled to said means for generating signals representing a hitting symbol for generating first and second control signals to vary the horizontal and vertical positions of said hitting symbol;

means for ascertaining coincidence between a hitting symbol and a hit symbol;

first means for differentiating a portion of the signal output of said first control signal generating means upon coincidence between said hitting symbol and said hit symbol;

second means for differentiating a portion of the signal output of said second control signal generating means upon coincidence between said hitting symbol and said hit symbol;

first means for integrating said first differentiated signal for providing a first hit symbol control voltage;

second means for integrating said second differentiated signal and for providing a second hit symbol control voltage;

a hit symbol generator having as control inputs thereto said first and second hit symbol control voltages whereby said hit symbol moves with a velocity proportional to the velocity of a hitting when coincident therewith.

18. Apparatus as defined in claim 17 further including first and second RC delay circuits coupled to said first and second differentiating means, respectively.

19. Apparatus as defined in claim 18, further including means for reversing the polarity of said first and second hit symbol control voltages when the outputs of said first and second integrators reach at least a first predetermined voltage level.

20. Apparatus as defined in claim 19 wherein said polarity reversing means, includes:

a first and second comparators coupled to the outputs of said first and second integrators, respectively;

means for applying reference signals to said first and second comparators; and means for reversing the polarity of the outputs of said differentiators responsive to outputs of said comparators.

21. Apparatus as defined in claim 20, further including first and second bistable multivibrators coupled to said first and second comparators, respectively, the outputs of said bistable multivibrators signifying the desired relative polarity of said integrator outputs.

22. In combination with a standard television receiver, apparatus for generating signals representing a first and second hitting symbol and a hit symbol to be displayed on the screen of said television receiver, comprising:

means for generating sync signals;

means for generating a first sawtooth wave;

means for generating a second sawtooth wave;

a first hitting symbol generator;

a second hitting symbol generator;

a hit symbol generator;

means for applying said first and second sawtooth waves to said symbol generators;

means for generating first and second control signals for said first hitting symbol generator;

means for coupling said first and second control signals to said first hitting symbol generator;

means for generating third and fourth control signals for said second hitting symbol generator;

means for coupling said third and fourth control signals to said second hitting symbol generator;

means for generating fifth and sixth control signals for said hit symbol generator;

means for coupling said fifth and sixth control signals to said hit symbol generator;

means for coupling said first, second, third, and fourth control signals to said means for generating fifth and sixth control signals; and means for coupling the outputs of said symbol generators and said sync signals to the television receiver.

23. Apparatus as defined in claim 22 wherein said means for generating fifth and sixth control signals includes:

first means for detecting coincidence between said first hit symbol and said hitting symbol;

second means for detecting coincidence between said second hit symbol and said hitting symbol;

a first monostable multivibrator coupled to said first coincidence means;

a second monostable multivibrator coupled to said second coincidence means;

first, second, third, and fourth gates having as inputs thereto said first, third, second, and fourth control signals, respectively;

means for coupling the output of said first monostable multivibrator to said first and third gates;

means for coupling the output of said second multivibrator to said second and fourth gates;

a first differentiator coupled to said first and second gates;

a second differentiator coupled to said third and fourth gates;

first sampling means coupled to said first differentiator;

second sampling means coupled to said second differentiator;

first and second OR gates, the outputs thereof being coupled to said first and second sampling means, respectively, the inputs thereof being coupled to both said monostable multivibrators;

first and second peak detectors coupled to said first and second sampling means, respectively; and first and second integrators coupled to said first and second peak detectors, respectively, said fifth and sixth control signals being derived at the outputs of said first and second integrators, respectively.

24. Apparatus as defined in claim 23, further including:

third and fourth OR gates, each coupled to both said monostable multivibrators;

a first and second bistable multivibrator, each having first and second inputs, said first inputs taken at the outputs of said third and fourth OR gates, respectively;

a first and second comparator, the outputs thereof being coupled to second inputs of said first and second bistable multivibrators, respectively;

said first and second comparators being coupled to said first and second integrators, respectively;

means for generating reference voltages;

means for applying said reference voltages to said comparators; and first and second means for reversing the polarity of the outputs of said peak detectors, said polarity reversing means coupled to the outputs of said first and second bistable multivibrators, respectively.

25. In combination with a standard television receiver, apparatus for generating symbols upon the screen of the receiver to be manipulated by at least one participant, comprising:

means for generating a hitting symbol, and means for generating a hit symbol including means for ascertaining coincidence between said hitting symbol and said hit symbol and means for imparting a distinct motion to said hit symbol upon coincidence.

26. The combination of claim 25 wherein said means for generating a hitting symbol includes means for providing horizontal and vertical control signals for varying the horizontal and vertical positions of said hitting symbol.

27. The combination of claim 26 wherein said means for providing horizontal control signals includes a voltage source, a potentiometer coupled across said voltage source and an integrator coupled to the arm of said potentiometer, said control signal being derived at the output of said integrator.

28. The combination of claim 25 wherein said means for generating a hit symbol includes means for providing horizontal and vertical control signals for varying the horizontal and vertical positions of said hit symbol.

29. The combination of claim 28 wherein said means for providing horizontal control signals for said hit symbol includes means for causing said hit symbol to move back and forth across the screen when triggered.

30. The combination of claim 29 wherein said triggering means includes a slow free-running multivibrator.

31. The combination of claim 29 further including means for detecting coincidence between a hit symbol and a hitting symbol and means for causing said hit symbol to change direction upon coincidence.

32. The combination of claim 25 wherein said means for generating a hit symbol further includes means for causing said hit symbol to move away from a predetermined position of the screen with a reflection angle equal to the incident angle at which said hit symbol approached said predetermined position.

33. In combination with a standard television receiver, apparatus for generating signals representing a symbol to be displayed on the screen of said television receiver, comprising:

means for generating sync signals;

means for generating a first sawtooth wave;

means for generating a second sawtooth wave;

means coupled to said first sawtooth wave generating means for generating first current pulses proportional to a predetermined slice of said first sawtooth wave; including a first slicer having first and second diodes connected back-to-back with one junction thereof coupled to said first sawtooth wave generating means, a capacitor coupled from the other junction to ground and means for receiving a control signal at said other junction, and first means for differentiating the output from said first slicer;

means coupled to said second sawtooth wave generating means for generating second current pulses proportional to a predetermined slice of said second sawtooth wave; including a second slicer having third and fourth diodes connected back-to-back with one junction thereof coupled to said second sawtooth wave generating means, a capacitor coupled from the other junction to ground and means for receiving a control signal at said other junction and second means for differentiating the output from said second slicer;

a coincidence gate coupled to said first and second current pulse generating means;

means for summing the output from said coincidence gate and sync signals;

means for applying the output of said summing means to the video and sync circuits of said television receiver.

34. Apparatus as defined in claim 33, further including means for disconnecting the video detector of said television receiver from said video amplifier.

35. In combination with a standard television receiver, apparatus for generating signals representing a first and second hitting symbol and a hit symbol to be displayed on the screen of said television receiver, comprising:

means for generating a first sawtooth wave;

means for generating a second sawtooth wave;

a first hitting symbol generator;

a second hitting symbol generator;

a hit symbol generator;

means for applying said first and second sawtooth waves to said symbol generators;

means for generating first and second control signals for said first hitting generator;

means for coupling said first and second control signals to said first hitting symbol generator for changing the position thereof;

means for generating third and fourth control signals for said second hitting symbol generator;

means for coupling said third and fourth control signals to said second hitting symbol generator for changing the position thereof;

means for applying the output of said spot generator to the video amplifier of said television receiver.

36. In combination with a conventional television receiver, apparatus for generating signals representing a symbol to be displayed on the screen of said television receiver, comprising:

means for generating vertical and horizontal sawtooth waveforms;

means for synchronizing said vertical and horizontal sawtooth waveforms to the sync signals received in said television receiver from a broadcast signal;

a spot generator including a first slicer having first and second diodes connected back-to-back with one junction thereof coupled to said vertical sawtooth generating means, a capacitor coupled from the other junction to ground and means for receiving a first control signal at said other junction, and first means for differentiating the output from said first slicer, and a second slicer having third and fourth diodes connected back-to-back with one junction thereof coupled to said horizontal sawtooth generating means, a capacitor coupled form the other junction to ground and means for receiving a second control signal at said other junction, and second means for differentiating the output from said second slicer, and a coincidence gate coupled to said first and second differentials; and means for applying the output of said spot generator to the video amplifier of said television receiver.

37. The combination of claim 36, wherein said means for generating vertical and horizontal sawtooth waveforms includes means coupled to the horizontal and vertical deflection circuits of said television receiver.

38. Apparatus for generating symbols upon the screen of a cathode ray tube, comprising:

a cathode ray tube;

means for generating horizontal and vertical sync signals;

means for generating first and second sawtooth waves;

means for generating a video signal proportional to predetermined slices of said sawtooth waves including a first slicer having first and second diodes connected back-to-back with one junction thereof coupled to said vertical sawtooth generating means, a capacitor coupled from the other junction to ground and means for receiving a first control signal at said other junction, and first means for differentiating the output from said first slicer, and a second slicer having third and fourth diodes connected back-to-back with one junction thereof coupled to said horizontal sawtooth generating means, a capacitor coupled from the other junction to ground and means for receiving a second control signal at said other junction, and second means for differentiating the output from said second slicer, and a coincidence gate coupled to said first and second differentials;

a horizontal deflection circuit coupled to said cathode ray tube;

a vertical deflection coupled to said cathode ray tube circuit;

means for coupling said video signal to the intensity input of said cathode ray tube;

means for coupling said horizontal sync signals to said horizontal deflection circuits; and means for coupling said vertical sync signals to said vertical deflection circuit.

39. Apparatus as defined in claim 38, further including means for supplying high voltage to said cathode ray tube.

40. Apparatus as defined in claim 39 wherein said video signal coupling means includes a video amplifier.

44. Apparatus for playing ping-pong type games by displaying and manipulating symbols on the screen of a cathode ray tube, comprising:

means for generating a first hitting spot;

means for generating a second hitting spot;

means for generating a hit spot;

means for changing the vertical position of said first hitting spot;

means for changing the vertical position of said second hitting spot;

means for causing said hit spot to move from an off-screen left position to an off-screen right position and vice versa;

means for changing said off-screen right and off-screen left positions;

means for denoting coincidence between said first hitting spot and said hit spot;

means for denoting coincidence between said second hitting spot and said hit spot;

means for causing said hit spot to change horizontal direction upon coincidence between said hit spot and either of said hitting spots; and means for displaying said spots upon the screen of said cathode ray tube.

42. The apparatus of claim 41 further including means for causing said hit spot to move on-screen subsequent to said hit spot moving off-screen occurring when said hit spot does not make coincidence with one of said hitting spots when in vertical alignment therewith.

43. Apparatus for playing a gun ping-pong type game on the screen of a cathode ray tube, comprising:

means for generating a hit spot;

a first light sensitive gun;

a second light sensitive gun;

means for causing said hit spot to move from an off-screen right to an off-screen left position and vice versa;

means for causing said hit spot to change direction when one of said light guns receives a pulse of light energy from said hit spot; and means for serving said hit spot when said hit spot goes off-screen.

44. Apparatus for playing a baseball type game on the screen of a cathode ray tube, comprising:

means for displaying a hit spot;

means for displaying a hitting spot;

means for adjusting the vertical position of said hitting spot;

means for serving said hit spot; and means for varying the vertical position of said hit spot; and means for denoting coincidence between said hit and said hitting spot whereby said hit spot will reverse directions.

45. Apparatus for playing a hockey type game upon the screen of a cathode ray tube, comprising:

means for displaying a first hitting spot;

means for displaying a second hitting spot;

means for displaying a hit spot;

means for controlling the position of said first and second hitting spots;

means for controlling the position of said hit spot including means for ascertaining coincidence between either of said hitting spots and said hit spot and means for imparting a distinct motion to said hit spot upon coincidence.

46. Apparatus as defined in claim 45 wherein said means for controlling said hit spot includes means for causing said hit spot to move in the direction hit by a hitting spot and means for causing said hit spot to bounce away from the sides of said cathode ray tube when coincident therewith.

47. Apparatus for playing a simulated handball game upon the screen of a cathode ray tube, comprising:

means for displaying a first symbol representing a first player;

means for displaying a second symbol representing a second player; and means for displaying a third symbol representing a ball;

means for controlling the position of said first symbol on said cathode ray tube;

means for controlling the position of said second symbol on said cathode ray tube;

means for controlling the position of said third symbol on said cathode ray tube;

said means for controlling the position of said third symbol on said cathode ray tube including means for causing said third symbol to change direction upon coincidence between either of said first or second symbols and means for causing said third symbol to bounce off three of said four sides of said cathode ray tube upon coincidence therewith and to go off-screen when coincident with said fourth side of said cathode ray tube; and means for serving said third symbol when it goes off-screen at said fourth side of said cathode ray tube.

48. Apparatus for generating signals representing a symbol to be displayed on the screen of a television receiver, comprising:

means for generating sync signals;
means for generating a first sawtooth wave;
means for generating a second sawtooth wave;
means coupled to said first sawtooth wave generating means for generating first current pulses proportional to a predetermined slice of said first sawtooth wave including a first slicer having first and second diodes connected back-to-back with one junction thereof coupled to said first sawtooth wave generating means, a capacitor coupled from the other junction to ground and means for receiving a control signal to said other junction, and first means for differentiating the output from said first slicer;
means coupled to said second sawtooth wave generating means for generating second current pulses proportional to a predetermined slice of said second sawtooth wave including a second slicer having third and fourth diodes connected back-to-back with one junction thereof coupled to said second sawtooth wave generating means, a capacitor coupled from the other junction to ground and means for receiving a control signal at said other junction, and second means for differentiating the output from said second slicer;
a coincidence gate coupled to said first and second current pulse generating means;
means for coupling the output from said coincidence gate and said sync signals to a television receiver.

49. Apparatus for generating signals representing a hitting symbol and a hit symbol to be displayed on the screen of a television receiver, comprising:
means for generating synchronizing signals;
means for generating electrical signals representing a hitting symbol;
means coupled to said means for generating electrical signals representing a hitting symbol for generating first and second control signals to vary the horizontal and vertical positions of said hitting symbol;
first means for differentiating a portion of the signal output of said first control signal generating means;
second means for differentiating a portion of the signal output of said second control signal generating means;
first means for integrating said first differentiated signal for providing a first hit symbol control voltage;
second means for integrating said second differentiated signal and for providing a second hit symbol control voltage; and
a symbol generator having as control inputs thereto said first and second hit symbol control voltages whereby said hit symbol moves with a velocity proportional to the velocity of said hitting symbol when coincident therewith.

50. Apparatus for generating signals representing a first and second hitting symbol and a hit symbol to be displayed on the screen of a television receiver, comprising:
means for generating sync signals;
means for generating a first sawtooth wave;
means for generating a second sawtooth wave;
a first hitting symbol generator;
a second hitting symbol generator;
a hit symbol generator;
means for applying said first and second sawtooth waves to said symbol generators;
means for generating first and second control signals for said first hitting symbol generator;
means for coupling said first and second control signals to said first hitting symbol generator;
means for generating third and fourth control signals for said second hitting symbol generator;
means for coupling said third and fourth control signals to said second hitting symbol generator;
means for generating fifth an sixth control signals for said hit symbol generator;
means for coupling said fifth and sixth control signals to said hit symbol generator;
means for coupling said first, second, third, and fourth control signals to said means for generating fifth and sixth control signals; and
means for coupling the outputs of said symbol generators and said sync signals to a television receiver.

51. Apparatus for generating symbols upon the screen of a television receiver to be manipulated by at least one participant, comprising:
means for generating a hitting symbol; and
means for generating a hit symbol including means for ascertaining coincidence between said hitting symbol and said hit symbol and means for imparting a distinct motion to said hit symbol upon coincidence.

52. The combination of claim 51 wherein said means for generating a hitting symbol includes means for providing horizontal and vertical control signals for varying the horizontal and vertical positions of said hitting symbol.

53. The combination of claim 52 wherein said means for providing horizontal control signals includes a voltage source, a potentiometer coupled across said voltage source and an integrator coupled to the arm of said integrator, said control being derived at the output of said integrator.

54. The combination of claim 51 wherein said means for generating a hit symbol includes means for providing horizontal and vertical control signals for varying the horizontal and vertical positions of said hit symbol.

55. The combination of claim 54 wherein said means for providing horizontal control signals for said hit symbol includes means for causing said hit symbol to move back and forth across the screen.

56. The combination of claim 55 wherein said means for causing said hit symbol to move back and forth across the screen includes a slow free-running multivibrator.

57. The combination of claim 55 further including means for detecting coincidence between a hit symbol and a hitting symbol and means for causing said hit symbol to change direction upon coincidence.

58. Apparatus for generating signals representing a symbol to be displayed on the screen of a television receiver, comprising:
means for generating sync signals;
means for generating a horizontal sawtooth wave;
means for generating a vertical sawtooth wave;
means coupled to said horizontal sawtooth wave generating means for generating first current pulses proportional to a predetermined slice of said horizontal sawtooth wave including a first slicer having first and second diodes connected back-to-back with one junction thereof coupled to said horizontal sawtooth wave generating means, a capacitor coupled from the other junction to ground and means for receiving a control signal at said other junction, and first means for differentiating the output from said first slicer;
means coupled to said vertical sawtooth wave generating means for generating second current pulses proportional to a predetermined slice of said vertical sawtooth wave including a second slicer having third and fourth diodes connected back-to-back with one junction thereof coupled to said vertical sawtooth wave generating means, a capacitor coupled from the other junction to ground and means for receiving a control signal at said other junction and second means for differentiating the output from said second slicer;
a coincidence gate coupled to said first and second current pulse generating means;
means for summing the output from said coincidence gate and sync signals;
means for applying the output of said summing means to the video amplifier of a television receiver.

59. Apparatus for generating signals representing a first and second hitting symbol and a hit symbol to be displayed on the screen of a television receiver, comprising;
means for generating a first sawtooth wave;
means for generating a second sawtooth wave;
a first hitting symbol generator;
a second hitting symbol generator;
a hit symbol generator;

means for applying said first and second sawtooth waves to said symbol generators;

means for generating first and second control signals for said first hitting symbol generator;

means for coupling said first and second control signals to said first hitting symbol generator;

means for generating third and fourth control signals for said second hitting symbol generator;

means for coupling said third and fourth control signals to said second hitting symbol generator;

means for generating fifth and sixth control signals for said hit symbol generator;

means for coupling said fifth and sixth control signals to said hit symbol generator;

means for coupling said first, second, third, and fourth control signals to said means for generating fifth and sixth control signals; and means for coupling the outputs of said symbol generators to the video amplifier of a television receiver.

* * * * *

PO-1050
(5/69)

UNITED STATES PATENT OFFICE
CERTIFICATE OF CORRECTION

Patent No. 3,659,284 Dated April 25, 1972

Inventor(s) William T. Rusch

It is certified that error appears in the above-identified patent and that said Letters Patent are hereby corrected as shown below:

Column 2, line 73 the word "supplies" should be deleted.
Column 7, line 25 the phrase --Serial No. 126,966-- should be inserted after the word "application".
Column 12, line 3 the number "13" should read --113--.
Column 15, line 2 the number "697,798" should read --126,966--.
Column 22, lines 69, 70 the phrase "means for applying the output of said spot generator to the video amplifier of said television receiver" should read --means for generating fifth and sixth control signals for said "hit" symbol generator;

means for coupling said fifth and sixth control signals to said "hit" symbol generator for changing the position thereof;

means for coupling said first, second, third and fourth control signals to said means for generating fifth and sixth control signals such that the motion of said "hit" symbol is dependent on the position of a "hitting" symbol; and means for coupling the outputs of said symbol generators to the video amplifier of said television receiver--.

Column 23, line 13 the word "form" should read --from--.
Column 23, line 60 the number "44" should read --41--.

Signed and sealed this 8th day of May 1973.

(SEAL)
Attest:

EDWARD M.FLETCHER,JR.
Attesting Officer

ROBERT GOTTSCHALK
Commissioner of Patents